US012137066B2

(12) United States Patent
Yang et al.

(10) Patent No.: US 12,137,066 B2
(45) Date of Patent: Nov. 5, 2024

(54) DM-RS BUNDLING FOR INTERRUPTED TRANSMISSIONS

(71) Applicant: QUALCOMM Incorporated, San Diego, CA (US)

(72) Inventors: Wei Yang, San Diego, CA (US); Yi Huang, San Diego, CA (US); Alexandros Manolakos, Escondido, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 17/755,044

(22) PCT Filed: Oct. 28, 2020

(86) PCT No.: PCT/US2020/057789
§ 371 (c)(1),
(2) Date: Apr. 19, 2022

(87) PCT Pub. No.: WO2021/096686
PCT Pub. Date: May 20, 2021

(65) Prior Publication Data
US 2022/0393824 A1 Dec. 8, 2022

(30) Foreign Application Priority Data
Nov. 11, 2019 (GR) .............................. 20190100503

(51) Int. Cl.
*H04L 5/00* (2006.01)
*H04L 5/14* (2006.01)
*H04W 8/24* (2009.01)

(52) U.S. Cl.
CPC .............. *H04L 5/0051* (2013.01); *H04L 5/14* (2013.01); *H04W 8/24* (2013.01)

(58) Field of Classification Search
CPC ....... H04L 5/0051; H04L 5/14; H04L 1/1671; H04L 5/1469; H04L 5/0007;
(Continued)

(56) References Cited

U.S. PATENT DOCUMENTS 10,588,141 B2    3/2020   Rico Alvarino et al.
2021/0028899 A1*  1/2021   Medles ................. H04L 5/0044

FOREIGN PATENT DOCUMENTS

CN        103096389 A    5/2013
EP        3627947 A1     3/2020
(Continued)

OTHER PUBLICATIONS

International Search Report and Written Opinion—PCT/US2020/057789—ISA/EPO—Mar. 2, 2021.

*Primary Examiner* — Thai Nguyen
(74) *Attorney, Agent, or Firm* — ArentFox Schiff LLP

(57) ABSTRACT

A user equipment (UE) is transmits capability signaling information to a base station. The capability signaling information may be associated with a capability of the UE to maintain coherence and bundle demodulation reference signals (DM-RS) when a transmission is interrupted. The base station may receive a transmission from the UE having dropped symbols, may determine if the capability signaling information indicates that the UE maintained coherence over the dropped signals, and may utilize bundled DM-RS to decode the transmission if the capability signaling information indicates that the UE maintained coherence.

30 Claims, 16 Drawing Sheets

(58) Field of Classification Search
CPC ...... H04L 5/0064; H04L 5/0048; H04W 8/24; H04W 72/21; H04W 72/1268
See application file for complete search history.

(56) References Cited

FOREIGN PATENT DOCUMENTS

| | | | | |
|---|---|---|---|---|
| KR | 102030829 | B1 | 10/2019 | |
| WO | 2016048597 | A1 | 3/2016 | |
| WO | 2018005481 | A1 | 1/2018 | |
| WO | 2019099517 | | 5/2019 | |
| WO | 2019140342 | A1 | 7/2019 | |
| WO | WO-2020032699 | A1 * | 2/2020 | ........... H04L 1/1614 |
| WO | WO-2020196546 | A1 * | 10/2020 | ........... H04L 5/0037 |

* cited by examiner

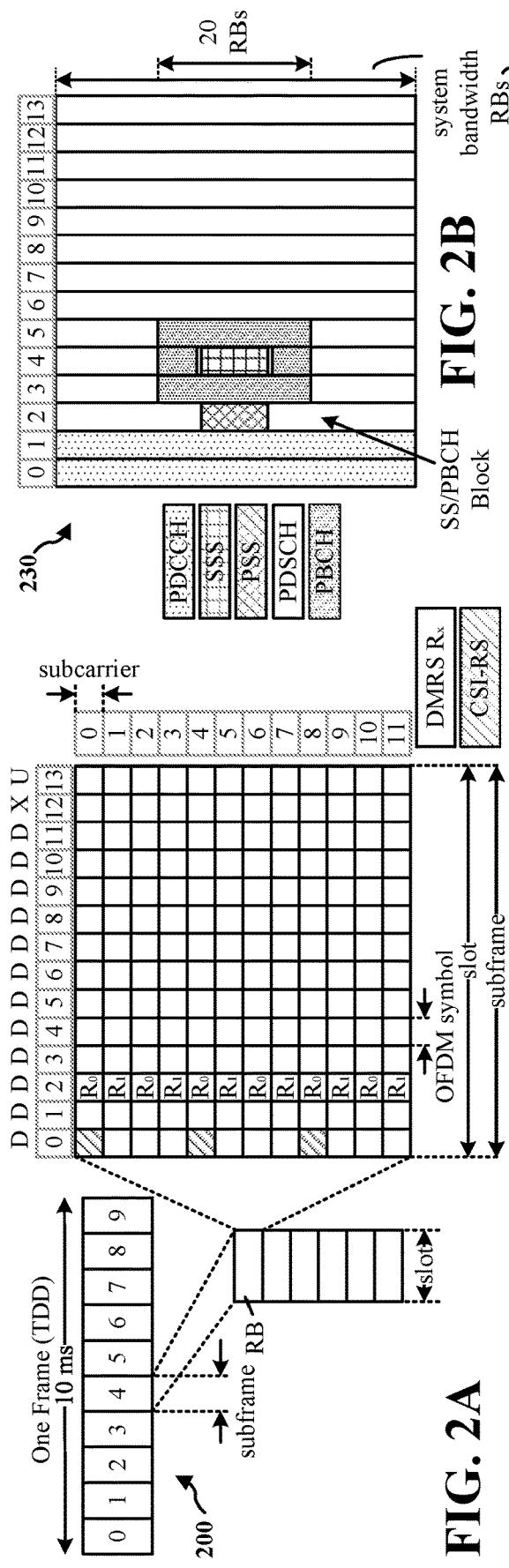
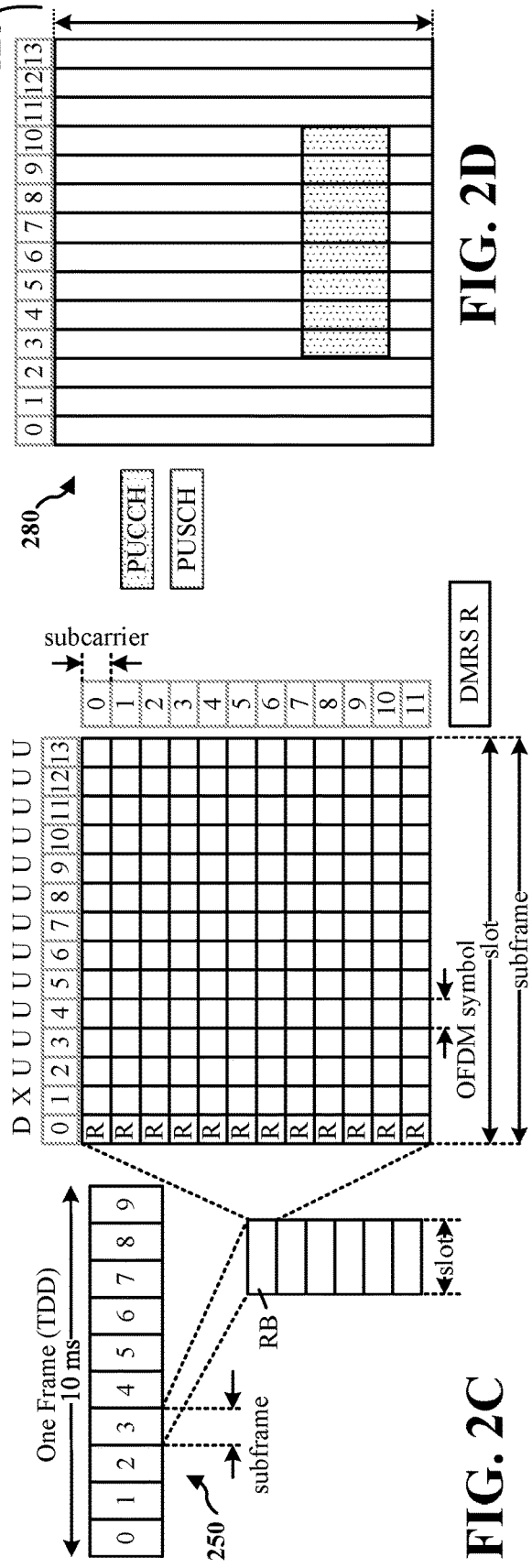
FIG. 2A  FIG. 2B  FIG. 2C  FIG. 2D

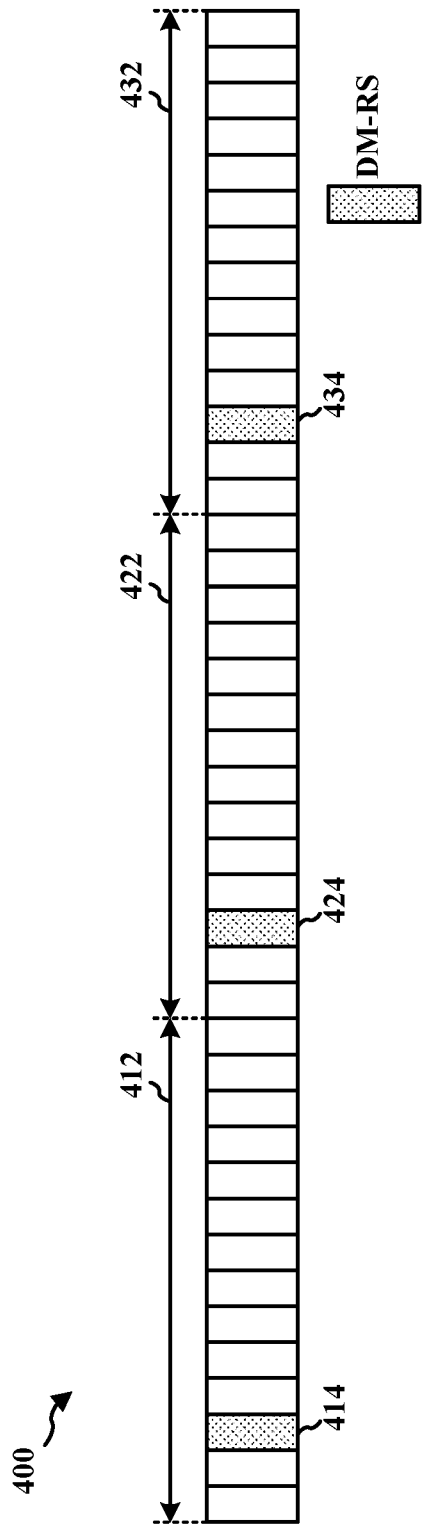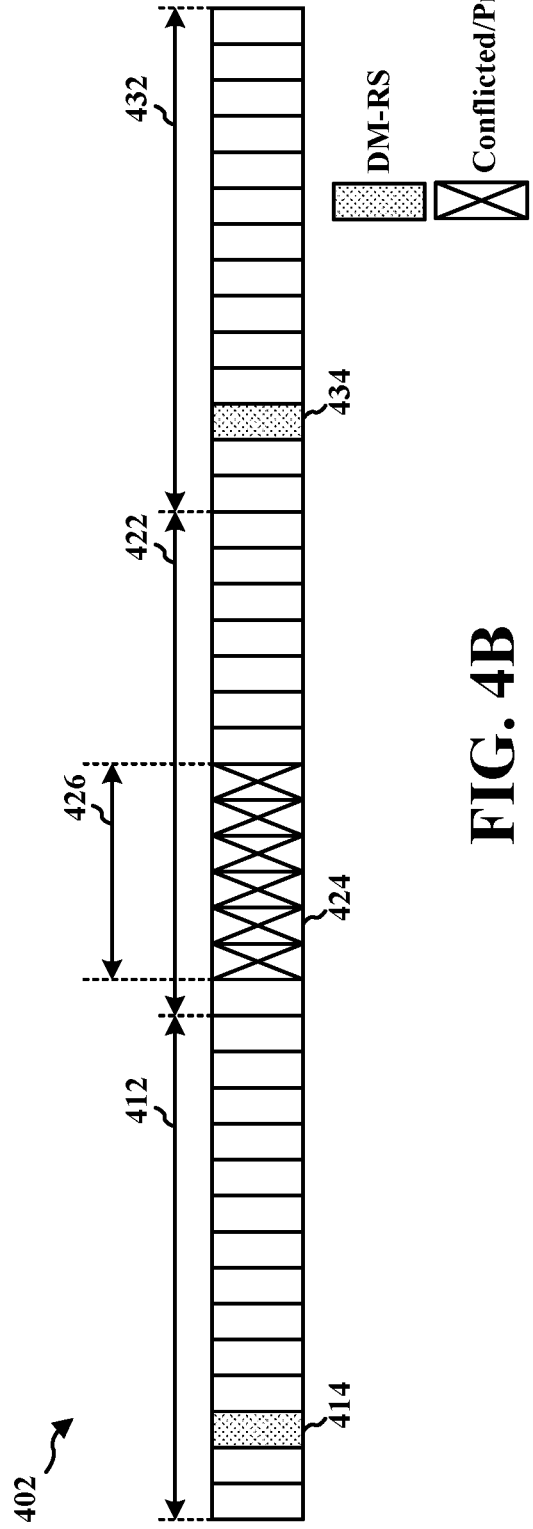
FIG. 4A
FIG. 4B

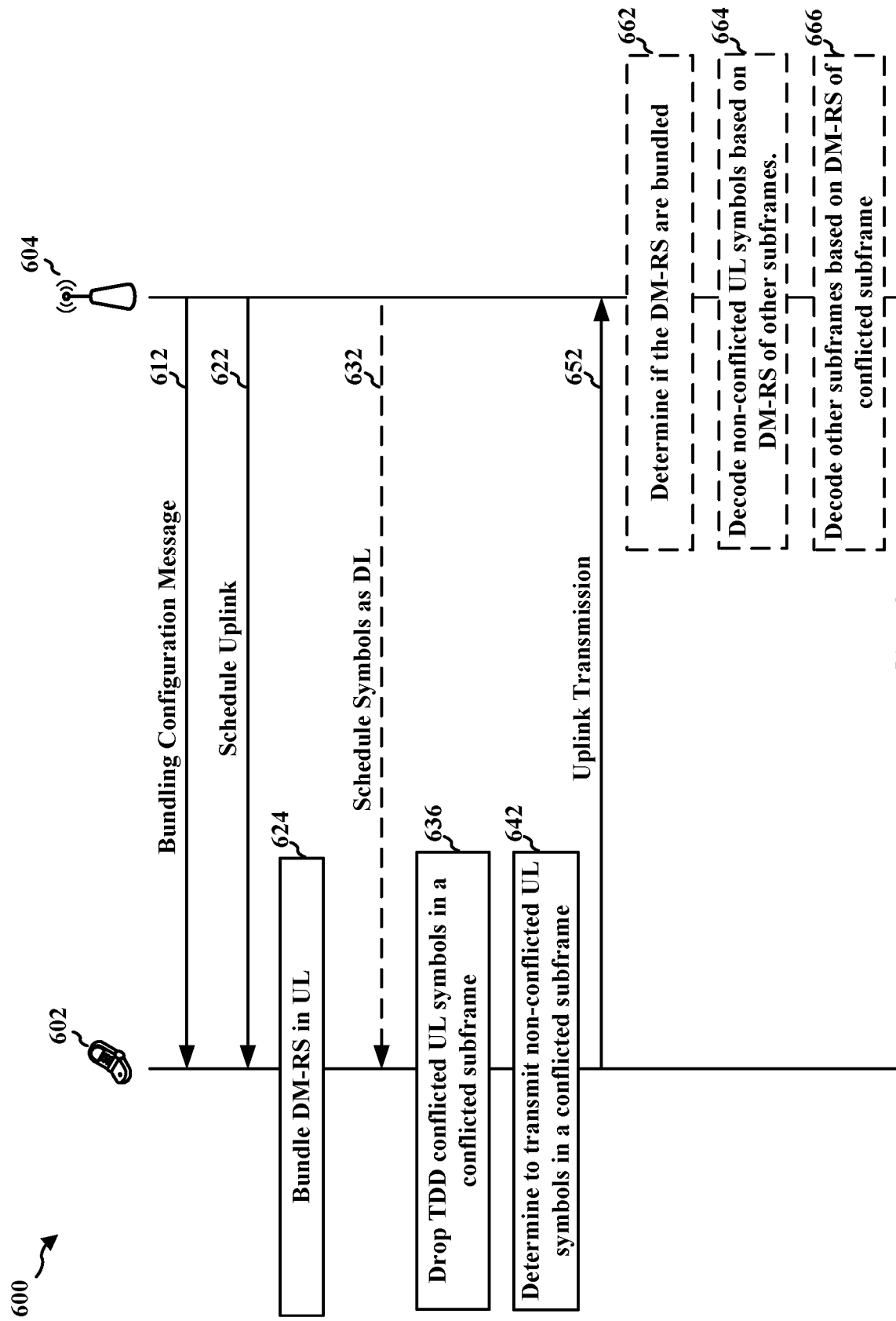

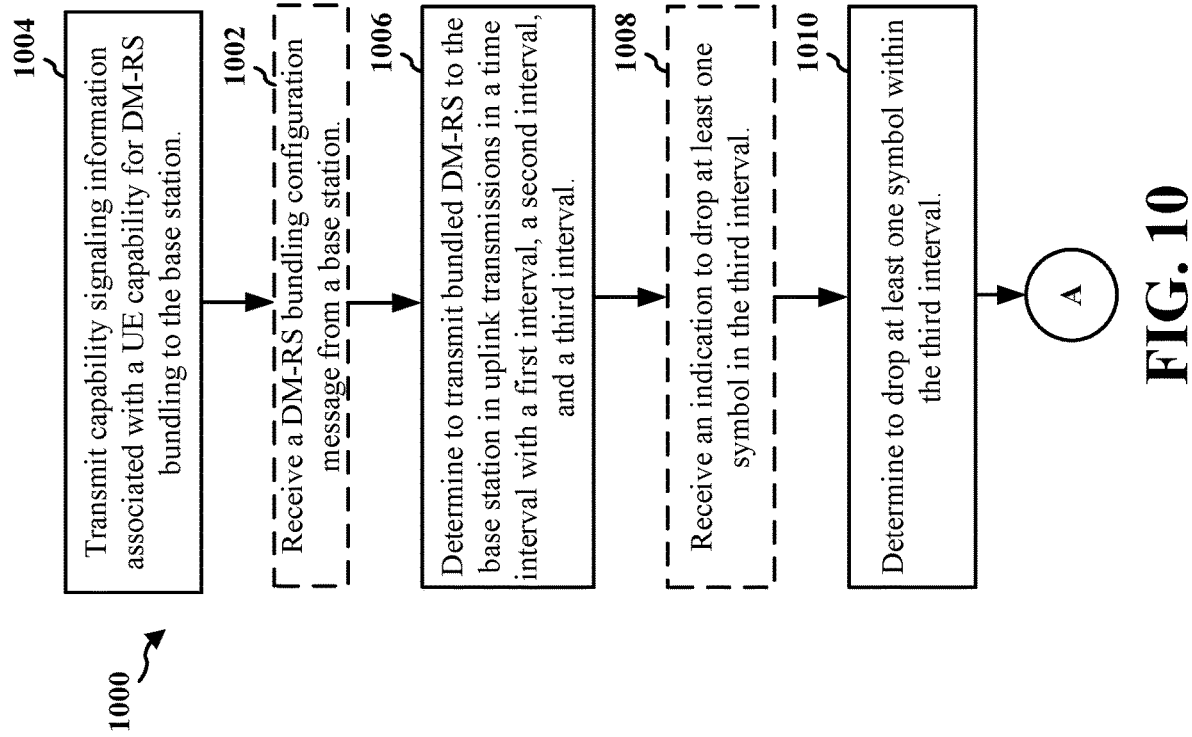

DM-RS BUNDLING FOR INTERRUPTED TRANSMISSIONS

CROSS REFERENCE TO RELATED APPLICATIONS

This application is a National Phase entry of PCT Application No. PCT/US2020/057789, entitled "DM-RS BUNDLING FOR INTERRUPTED TRANSMISSIONS" and filed on Oct. 28, 2020, which claims priority of Greek Application No. 20190100503, entitled "DM-RS BUNDLING FOR INTERRUPTED TRANSMISSIONS" and filed on Nov. 11, 2019, both of which are expressly incorporated by reference herein in their entirety.

BACKGROUND

Technical Field

The present disclosure relates generally to communication systems, and more particularly, to a wireless communication system utilizing DM-RS bundling.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A transmitter may transmit bundled demodulation reference signals (DM-RS). In decoding the transmission, the receiver may acquire a more accurate channel estimation for a subframe by utilizing the bundled DM-RS to perform the based on DM-RS transmitted in multiple subframes.

A scheduled transmission may be interrupted for various reasons. When the scheduled transmission is interrupted, the transmissions sent before the interruption may or may not lack coherence with the transmissions sent after the interruption. When transmissions lack coherence, DM-RS in the respective transmissions cannot be bundled and the receiver cannot utilize bundled DM-RS to decode the transmissions.

In some aspects according to the present disclosure, a transmitter transmits capability signaling information to a receiver. The capability signaling information may be associated with a capability of the transmitter to maintain coherence and bundle DM-RS when a transmission is interrupted. The receiver may receive a transmission from the transmitter having dropped symbols, may determine if the capability signaling information indicates that the transmitter maintained coherence over the dropped signals, and may utilize bundled DM-RS to decode the transmission if the capability signaling information indicates that the transmitter maintained coherence.

In an aspect of the disclosure, a method, a computer-readable medium, and an apparatus are provided. The apparatus transmits capability signaling information to a base station associated with a UE capability of the UE for demodulation reference signals (DM-RS) bundling, determines to transmit bundled DM-RS to the base station within a plurality of uplink transmissions within a time interval, the time interval comprising a first interval corresponding to a first uplink transmission of the plurality of uplink transmissions, a second interval corresponding to a second uplink transmission of the plurality of uplink transmissions, and an intervening interval between the first interval and the second interval corresponding to an intervening uplink transmission of the plurality of uplink transmissions, determines to drop at least one symbol within the intervening interval, and transmits DM-RS in the first interval and the second interval, wherein whether the DM-RS in the second interval is transmitted such that the DM-RS in the second interval is bundled with the DM-RS in the first interval is based on the UE capability.

In an aspect of the disclosure, a method, a computer-readable medium, and an apparatus are provided. The apparatus receives capability signaling information from a user equipment (UE), receives an uplink communication from the UE, the uplink communication comprising a time interval comprising a first interval corresponding to a first uplink transmission, a second interval corresponding to a second uplink transmission, and an intervening interval between the first interval and the second interval corresponding to an intervening uplink transmission, the uplink communication further comprising DM-RS in the first and second intervals, determines that the UE dropped at least one symbol within the intervening interval, and decodes the first interval and the second interval, wherein whether the DM-RS in the second interval is utilized for decoding the first interval and whether the DM-RS in the first interval is utilized for decoding the second interval is based on the capability signaling information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 4A is a diagram illustrating subframes for communication between a UE and a base station.

FIG. 4B is a diagram illustrating the subframes of FIG. 4A with conflicted or preempted symbols.

FIG. 6 is a communication flow diagram illustrating the use of bundled DM-RS in an uplink transmission with a TDD UL/DL conflict.

FIGS. 10 and 11 are a flowchart of a method of wireless communication.

DETAILED DESCRIPTION

Figure 1:
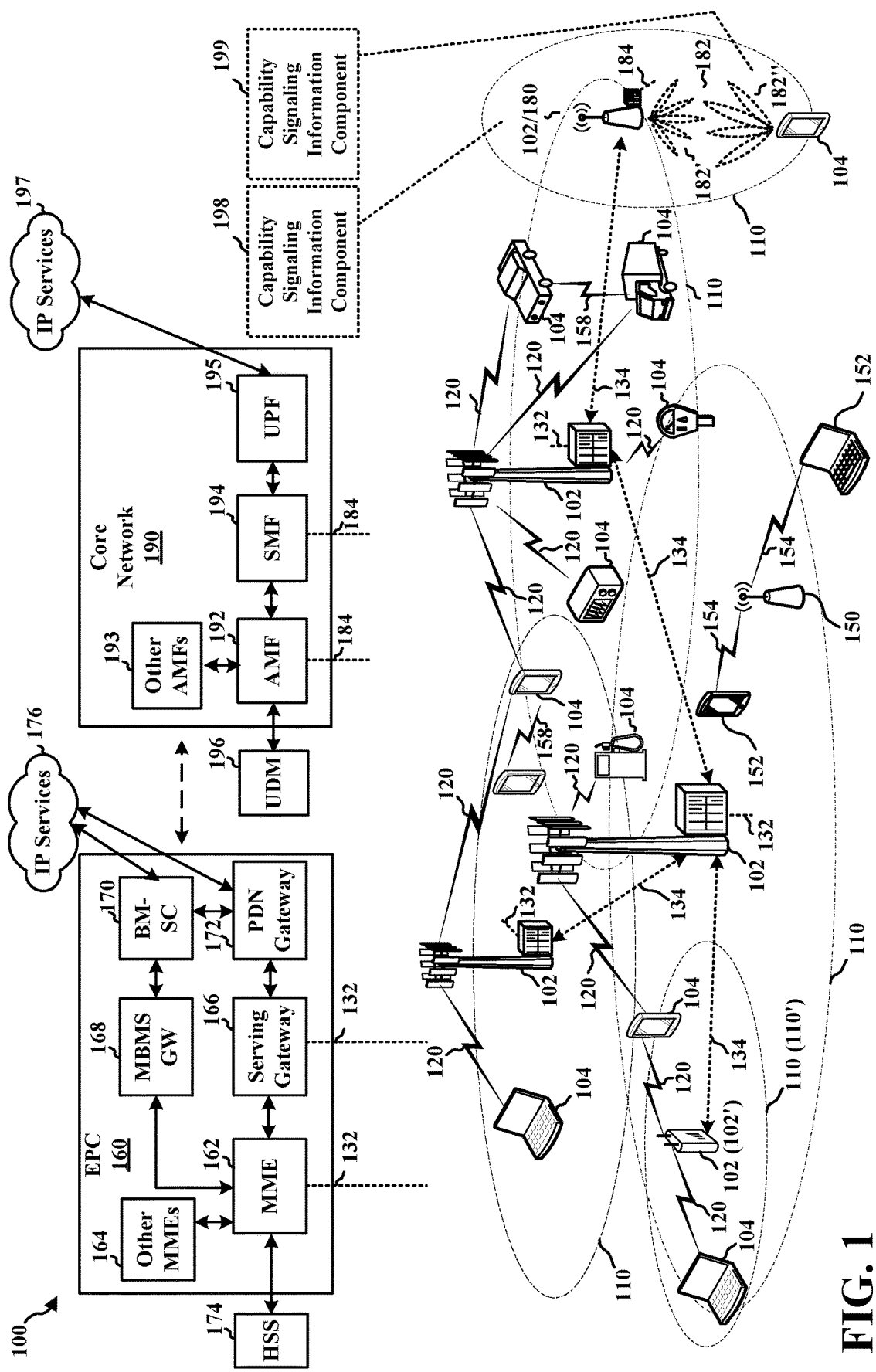
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a capability signaling information component 199 configured to transmit capability signaling information associated with a DM-RS bundling capability of the UE 104 to the base station 180, and the base station 180 may include a capability signaling information component 198 configured to receive the capability signaling information and to determine whether to use bundled DM-RS to decode a transmission from the UE 104 based on the capability signaling information. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
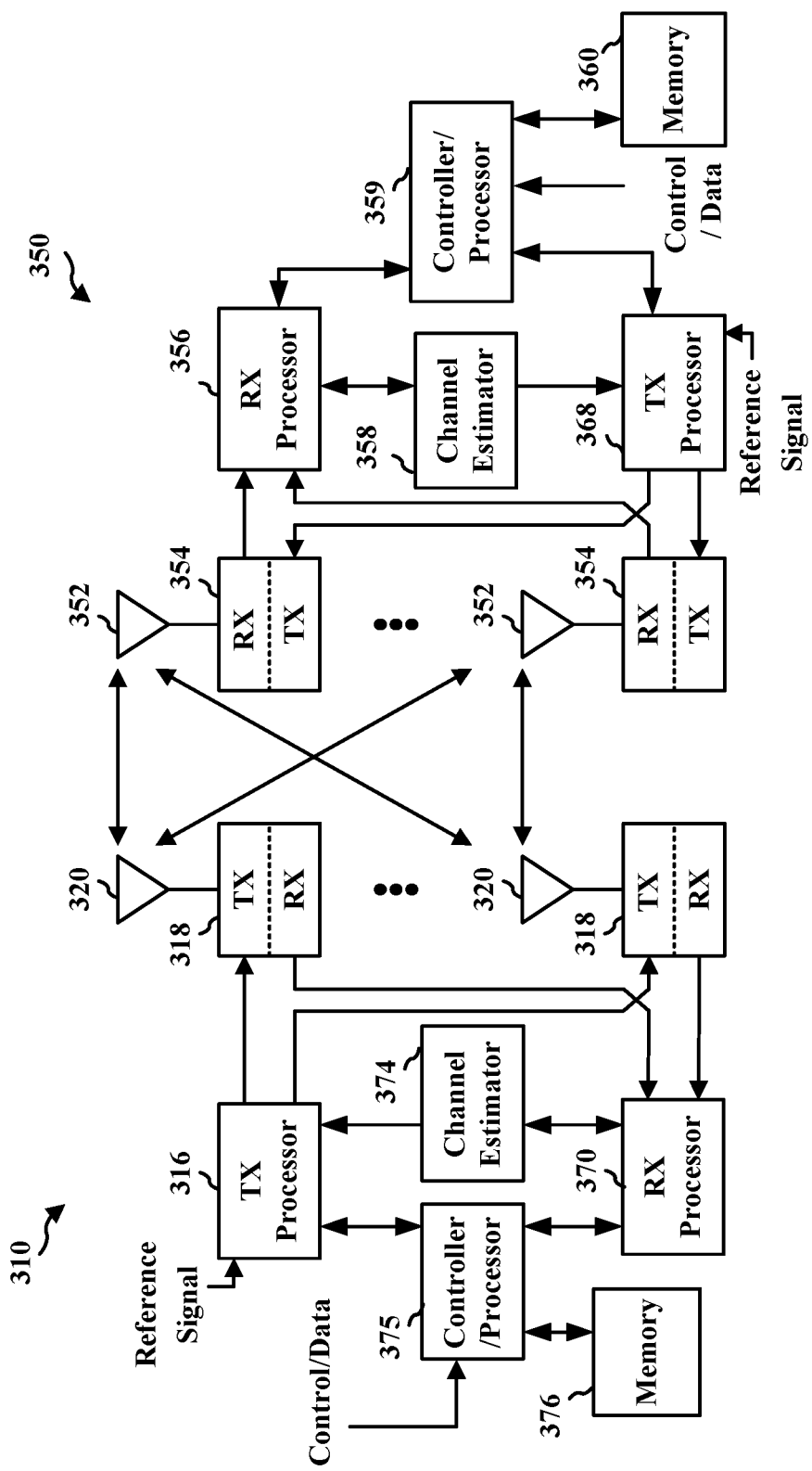
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

FIG. 4A is a diagram 400 illustrating subframes for communication between a UE and a base station. The subframes include three contiguous subframes: a first subframe 412, a second subframe 432, and an intervening subframe 422 between the first subframe 412 and the second subframe 432. A UE may be scheduled for uplink transmissions on the first subframe 412, the second subframe 432, and the intervening subframe 422. The UE may be scheduled to transmit DM-RS on a symbol 414 (e.g., an OFDM symbol) of the first subframe 412, a symbol 434 of the second subframe 432, and a symbol 424 of the intervening subframe 422.

The UE and the base station may utilize DM-RS bundling. The channel between the UE and the base station during contiguous subframes may be correlated (e.g., strongly correlated). Bundled DM-RS may be DM-RS transmitted coherently with respect to each other. The UE may transmit the DM-RS in the symbol 414, the symbol 424, and the symbol 434 as bundled DM-RS. The base station may receive the bundled DM-RS, and in decoding the uplink transmissions from the UE may perform joint channel estimation for each of the contiguous subframes 412, 422, and 432 based on the bundled DM-RS. For example, the base station may estimate the channel for the first subframe 412 based on the bundled DM-RS received at the symbol 414, the bundled DM-RS received at the symbol 424, and the bundled DM-RS received at the symbol 434.

FIG. 4B is a diagram 402 illustrating the subframes of FIG. 4A with conflicted or preempted symbols 426. As described above, a UE may be scheduled to transmit on the subframes 412, 422, and 432. An interruption event may occur, preventing the UE from transmitting on the conflicted or preempted symbols 426.

In some aspects, the interruption event may be a TDD UL/DL conflict. The base station may indicate that the conflicted or preempted symbols 426 are for downlink transmission, while some or all of the symbols were initially scheduled for uplink transmission. The UE may not transmit its scheduled UL transmission on the conflicted or preempted symbols 426.

In some aspects, the interruption event may be an inter-UE prioritization conflict. The UE may initially be scheduled for a low-priority uplink transmission. The base station may signal the UE to cancel its transmission on the conflicted or preempted symbols 426 to allow for a high-priority transmission between another UE and the base station, for example by transmitting an uplink cancellation indication (ULCI) to the UE. For example, the UE may be scheduled to transmit an eMBB uplink transmission on the conflicted or preempted symbols 426 and the base station may send a ULCI to the UE to cancel the eMBB uplink transmission on the conflicted or preempted symbols 426 to allow another UE to transmit a URLLC uplink transmission on the conflicted or preempted symbols 426.

In some aspects, the interruption event may be an intra-UE prioritization conflict. The UE may be scheduled to transmit a low-priority uplink transmission on the conflicted or preempted symbols 426, and the low-priority uplink transmission may be preempted by a high-priority uplink transmission by the same UE. The UE may transmit the high-priority uplink transmission on the conflicted or preempted symbols 426.

In some aspects, the conflicted or preempted symbols 426 may include the symbol 424 on which the UE was scheduled to transmit DM-RS. Accordingly, the UE may not transmit DM-RS for the intervening subframe 422.

Where an interruption event interrupts a UE's transmission to a base station, the UE's transmission before the conflicted or preempted symbols 426 may or may not be coherent with the UE's transmission after the conflicted or preempted symbols 426. For example, a UE may not be able to maintain coherence between transmissions if it does not transmit over a certain number of symbols, or may not be able to maintain coherence between transmissions if it shuts off its transmitter to utilize its receiver.

When a transmission in one subframe lacks coherence with a transmission in another subframe, a receiver (e.g., the base station) may be unable to coherently filter the bundled DM-RS for the subframes. The receiver may not be able to perform channel estimation jointly for the subframes using the bundled DM-RS. Accordingly, the receiver may not be able to utilize bundled DM-RS for subframes which lack coherence and may perform channel estimation separately for each subframe.

Although one intervening subframe 422 between the first and second subframes 412 and 432 is shown throughout this specification, in some aspects, a set of intervening subframes may be between the first and second subframes 412 and 432, and the conflicted or preempted symbols 426 may be within multiple subframes of the set of intervening subframes.

Figure 5:
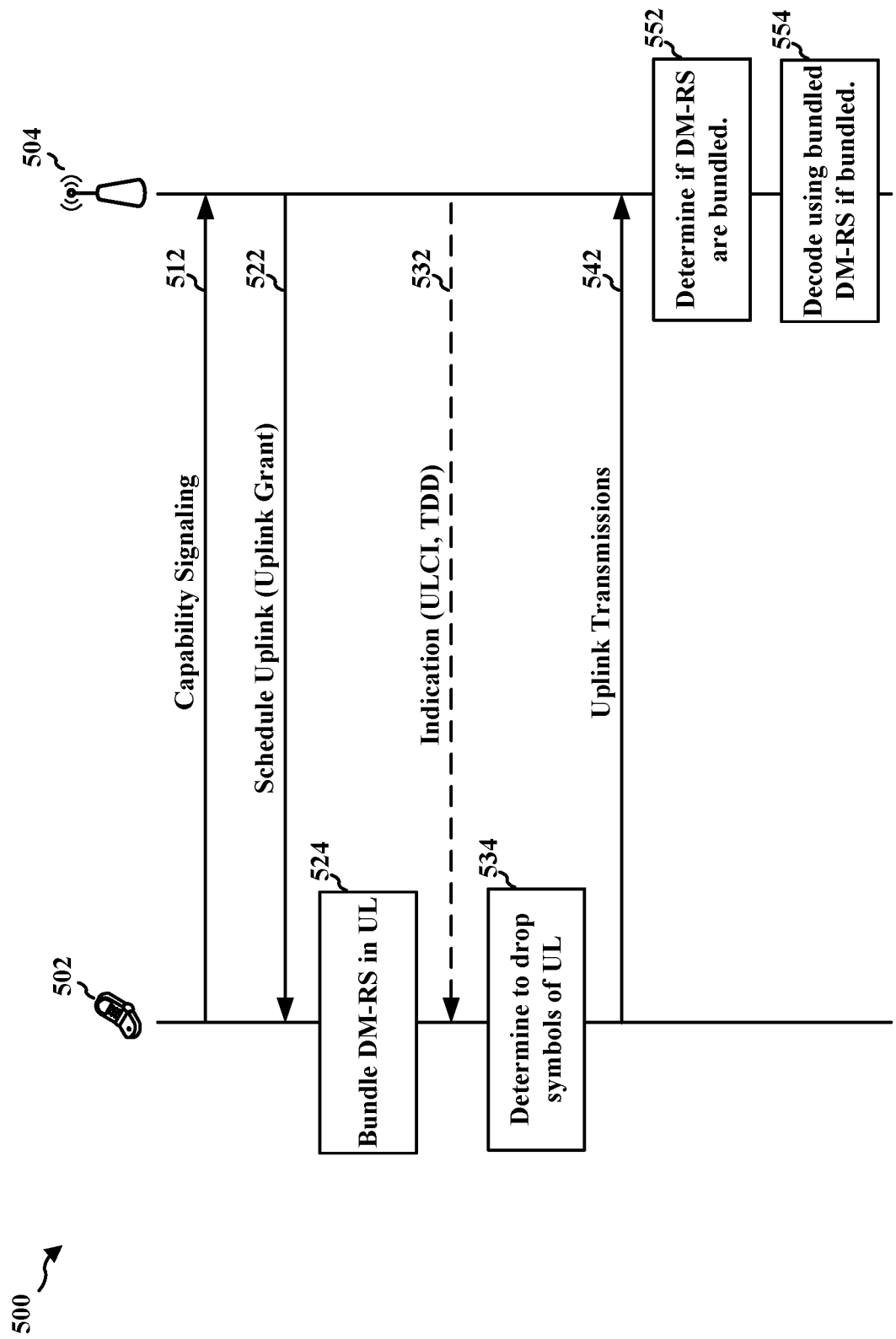
FIG. 5 is a communication flow diagram illustrating the use of bundled DM-RS in an uplink transmission with interrupted symbols.

FIG. 5 is a communication flow diagram 500 illustrating the use of bundled DM-RS in uplink transmissions including an uplink transmission with interrupted symbols. A UE 502 may transmit capability signaling 512 to a base station 504 and the base station 504 may receive the capability signaling 512. The capability signaling 512 may include information regarding the ability of the UE 502 to maintain coherence of its transmissions during an interruption event.

In some aspects, the capability signaling 512 may include a number of symbols, and the UE 502 may be able to maintain coherence of transmissions before and after pausing transmission for the number of symbols. In some aspects, the capability signaling 512 may indicate a type of interruption event which does or does not interrupt coherence of transmissions from the UE 502. For example, the capability signaling 512 may indicate that the UE 502 can maintain coherence before and after an intra-UE prioritization conflict, and the capability signaling 512 may indicate that the UE 502 cannot maintain coherence before and after a TDD UL/DL conflict. In some aspects, the capability signaling 512 may indicate a number of symbols for a type of interruption event over which the UE 502 can maintain coherence. For example, the capability signaling 512 may indicate that the UE 502 can maintain coherence before and after a TDD UL/DL conflict if the TDD UL/DL conflict interrupts the UE's transmission for five or fewer symbols. In some aspects, a UE may not be able to maintain coherence over a type of interruption event, and the capability signaling 512 may indicate zero symbols as the number of symbols for that type of interruption event.

The base station 504 may transmit a message 522 scheduling the UE 502 for uplink transmissions on particular resources. For example, the message 522 may be an uplink grant. The UE 502 may receive the message 522 and may generate uplink transmissions to be transmitted on the identified uplink resources. As illustrated at 524, the UE 502 may determine to bundle the DM-RS for the uplink communication and may include bundled DM-RS in the uplink transmissions. For example, the UE 502 may determine to bundle DM-RS in the uplink communication based on receiving an indication to bundle the DM-RS in the uplink communication from the base station 504.

The UE 502 may receive or detect an indication 532. In some aspects, the indication 532 may indicate that an interruption event has occurred. In some aspects, the indication 532 may trigger an interruption event, and the UE 502 may infer that the interruption event has occurred based on the indication 532. In some aspects, the base station 504 may transmit the indication 532 to the UE 502 and the UE 502 may receive the indication 532 from the base station 504. The indication 532 may be a TDD message transmitted from the base station 504 to the UE 502 indicating that one or more symbol scheduled for uplink is now scheduled for downlink (e.g., a TDD UL/DL conflict interruption even has occurred). The indication 532 may be a message (e.g., a ULCI) that the base station 504 transmits to the UE 502 indicating that an inter-UE prioritization interruption event has occurred. The indication 532 may be a message from the base station 504 to the UE 502 instructing the UE 502 to prioritize transmitting or receiving a high-priority transmission on certain symbols over a low-priority uplink transmission previously scheduled on those symbols (e.g., an intra-UE prioritization interruption event has occurred). In some aspects, the indication 532 may be internal to the UE 502. For example, the indication 532 may be or may result from the UE 502 determining to prioritize a high-priority uplink transmission over a scheduled low-priority uplink transmission.

As illustrated at 534, the UE 502 may determine to drop symbols of one of the uplink transmissions based on receiving the indication 532. The UE 502 may then transmit the uplink transmissions 542 to the base station 504, but may not transmit on the symbols which the UE 502 determined to drop at 534 (or, where the indication 532 indicated an intra-UE prioritization conflict, the UE 502 may transmit a high-priority transmission on the dropped symbols but may not transmit the previously scheduled low-priority uplink transmission on the dropped symbols).

The base station 504 may receive the uplink transmissions 542 with the dropped symbols. As illustrated at 552, the base station 504 may determine if the DM-RS included in an uplink transmission of the uplink transmissions 542 before the dropped symbols (e.g., in a subframe before the subframe or subframes where the dropped symbols were located) is bundled with the DM-RS included in an uplink transmission after the dropped symbols (e.g., in a subframe after the subframe or subframes where the dropped symbols were located). The base station 504 may utilize the capability signaling 512 to determine whether the DM-RS in the uplink transmissions 542 are bundled. The UE 502 may have included bundled DM-RS in the uplink transmissions at 524, but an interruption event subsequently occurred. The base station 504 may compare the interruption event to the capability signaling 512 to determine whether the UE 502 maintained coherence between an uplink transmission of the uplink transmissions 542 transmitted before the dropped symbols and another uplink transmission of the uplink transmissions 542 transmitted after the dropped symbols.

In one example, the base station 504 may identify the number of symbols dropped by the UE 502 and may compare the number of dropped symbols to a number of symbols in the capability signaling 512. In another example, the base station 504 may determine the type of interruption event that occurred and may determine whether the capability signaling 512 indicates that the UE 502 can maintain coherence through that type of interruption event. In another event, the base station 504 may determine the type of interruption event that occurred and the number of symbols dropped by the UE 502, and may compare the number of dropped symbols to a number of symbols corresponding to that type of interruption event in the capability signaling information 512.

If the capability signaling 512 indicates that the UE 502 can maintain coherence through the interruption event, the base station 504 may determine that the DM-RS received in an uplink transmission of the uplink transmissions 542 before the dropped symbols are bundled with the DM-RS received in an uplink transmission of the uplink transmissions 542 after the dropped symbols. For example, where a first subframe, a second subframe, and a set of intervening subframes between the first and second subframes are contiguous and the dropped symbols were located in the set of intervening subframes, the base station 504 may determine that the DM-RS transmitted in the first subframe and the DM-RS transmitted in the second subframe are bundled. If the base station 504 determines that the DM-RS are bundled, the base station 504 may decode the uplink transmissions 542 using channel estimates generated based on the bundled DM-RS (e.g., using a joint channel estimate), as illustrated at 554. For example, using the first and second subframe described above, the first subframe may be decoded using a channel estimation based on DM-RS transmitted in the first subframe and DM-RS transmitted in the second subframe, and the second subframe may be decoded using a channel estimation based on DM-RS transmitted in the first subframe and DM-RS transmitted in the second subframe. In some aspects, if the base station 504 determines that the DM-RS are not bundled, the base station 504 may decode the uplink transmissions 542 using a channel estimate for a subframe based on the DM-RS transmitted in that subframe (e.g., may perform a separate channel estimate for each subframe).

FIG. 6 is a communication flow diagram 600 illustrating the use of bundled DM-RS in uplink transmissions including an uplink transmission with a TDD UL/DL conflict. A base station 604 may transmit a bundling configuration message 612 to a UE 602 and the UE 602 may receive the bundling configuration message 612. The bundling configuration message 612 may indicate whether the base station 612 is configured for decoding uplink transmissions based on bundled DM-RS.

Figure 7A:
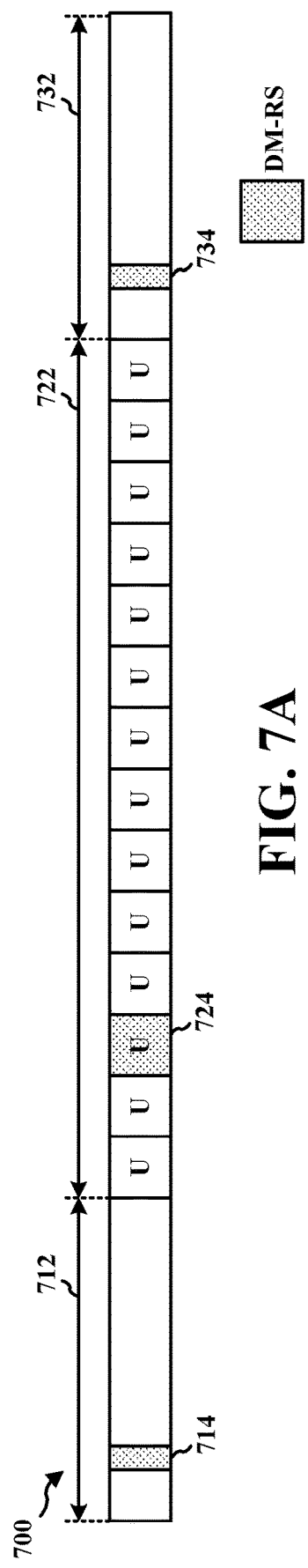
FIG. 7A is a diagram illustrating resources scheduled for uplink transmission.

The base station 604 may transmit a message 622 scheduling the UE 602 for uplink transmissions on particular resources. For example, FIG. 7A is a diagram 700 illustrating resources scheduled for uplink transmissions. A first subframe 712, a second subframe 732, and an intervening subframe 722 between the first and second subframes 712 and 732 are contiguous. The message 622 may schedule the UE 602 to transmit uplink transmissions to the base station 604 during the first subframe 712, the second subframe 732, and the intervening subframe 722, including to transmit DM-RS at symbol 714 in the first subframe 712, at symbol 734 in the second subframe 732, and at symbol 724 in the intervening subframe 722. As illustrated in FIG. 7A, the UE 602 may be scheduled to transmit an uplink transmission to the base station 604 on each symbol of the intervening subframe 722. The UE 602 may generate an uplink transmission to be transmitted on the identified uplink resources.

As illustrated at 624, if the bundling configuration message 612 indicated that the base station 604 is configured to decode uplink transmissions utilizing bundled DM-RS, the UE 602 may determine to bundle the DM-RS for its uplink communication and may include bundled DM-RS in the uplink transmissions. For example, referring again to FIG. 7A, the UE 602 may generate the uplink transmissions with the DM-RS to be transmitted on symbols 714, 724, and 734 as bundled DM-RS.

A TDD UL/DL conflict interruption event may occur. Symbols may be configured for uplink, downlink, or flex in multiple ways, such as an RRC configured TDD pattern or a dynamically scheduled TDD pattern. In some aspects, the base station 602 may transmit a TDD message 632 to the UE 602 scheduling symbols for downlink, where some or all of the symbols were previously scheduled for uplink. The symbols that were previously scheduled for uplink and are rescheduled to downlink may be referred to as conflicted symbols in a conflicted subframe, and a TDD UL/DL conflict interruption event may be occurring for those conflicted symbols. As illustrated at 636, the UE 602 may determine to drop the symbols of the uplink transmission that were to be transmitted on the conflicted symbols of the conflicted subframe.

In some aspects, the base station 602 may transmit an RRC configured TDD pattern, and the base station 602 may later schedule an uplink transmission with repetitions on some downlink symbols, causing a TDD UL/DL conflict interruption event.

Figure 7B:
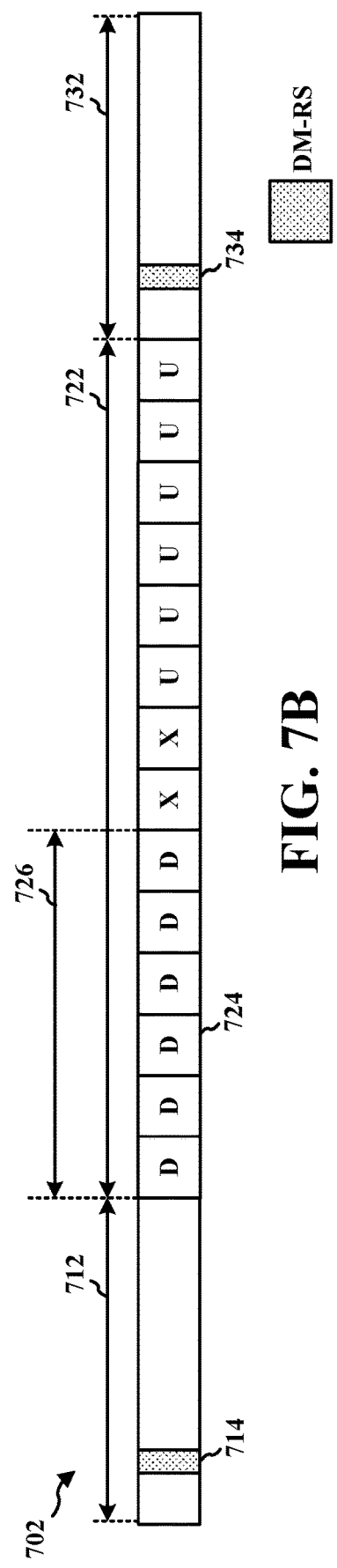
FIG. 7B is a diagram illustrating an example of the subframes of FIG. 7A with symbols rescheduled for downlink.

For example, FIG. 7B is a diagram 700 illustrating an example of the subframes of FIG. 7A with symbols rescheduled for downlink. In the example of FIG. 7B, the base station 604 may have changed the slot scheduling such that the first six symbols are scheduled for downlink, the seventh and eighth symbols are scheduled as flex, and the last six symbols are scheduled for uplink. Accordingly, at least the first six symbols are conflicted symbols 726 and the intervening subframe 722 is a conflicted subframe. As the conflicted symbols 726 include symbol 724, the UE 602 is no longer scheduled to uplink DM-RS during the intervening subframe 722.

Figure 7C:
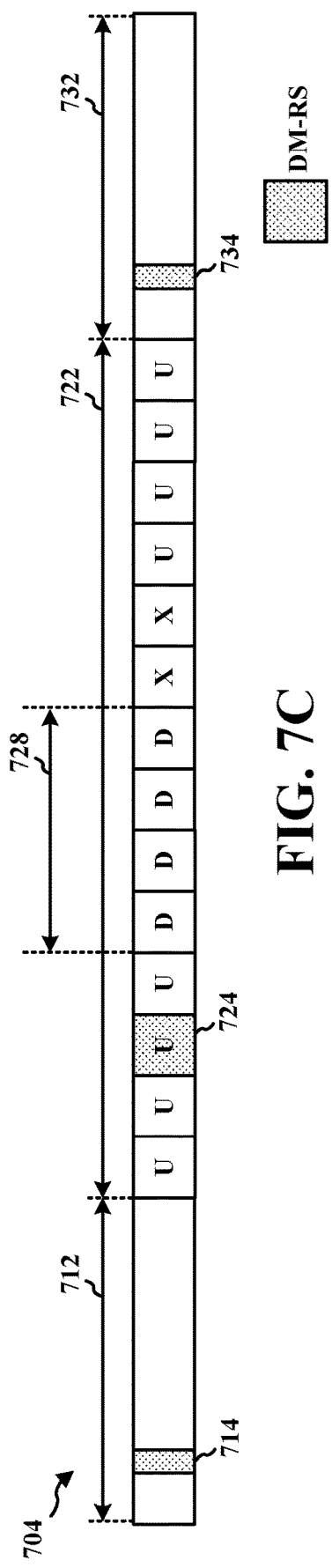
FIG. 7C is a diagram illustrating another example of the subframes of FIG. 7A with symbols rescheduled for downlink.

FIG. 7C is a diagram 704 illustrating another example of the subframes of FIG. 7A with symbols rescheduled for downlink. In the example of FIG. 7C, the base station 604 may have changed the slot scheduling such that the first four symbols are scheduled for uplink, the fifth, sixth, seventh, and eighth symbols are scheduled for downlink, the ninth and tenth symbols are scheduled as flex, and the last four symbols are scheduled for uplink. Accordingly, at least the fifth, sixth, seventh, and eight symbols are conflicted symbols 728 and the intervening subframe 722 is a conflicted subframe. As the conflicted symbols 728 do not include the symbol 724, the UE 602 is still scheduled to uplink DM-RS during the intervening subframe 722.

As illustrated at 642, the UE 602 may determine whether to transmit the uplink transmission on non-conflicted uplink symbols in the conflicted subframe. The UE 602 may determine whether to do so based on the bundling configuration message 612. If the bundling configuration message 612 indicated that the base station 604 is configured to decode uplink transmissions using bundled DM-RS, the UE 602 may determine to transmit the uplink transmission on non-conflicted uplink symbols in the conflicted frame. In some aspects, the UE 602 may determine to transmit the uplink transmission on non-conflicted symbols scheduled for uplink. In some aspects, the UE 602 may determine to transmit the uplink transmission on non-conflicted symbols scheduled for uplink and symbols scheduled as flex. For example, in FIG. 7B, the UE 602 may determine to transmit the uplink transmission on the last six symbols (scheduled for uplink), or on the seventh and eight symbols (scheduled as flex) and the last six symbols (scheduled for uplink). In the example of FIG. 7C, the UE 602 may determine to transmit the uplink transmission on the first four symbols and the last four symbols (scheduled for uplink), or on the ninth and tenth symbols (scheduled as flex), the first four symbols (scheduled for uplink), and the last four symbols (scheduled for uplink).

If the bundling configuration message 612 did not indicate that the base station 604 is configured to decode uplink transmissions using bundled DM-RS, or if the UE 602 did not receive a bundling configuration message 612 from the base station 604, the UE 602 may determine to drop the entire conflicted subframe. For example, in FIGS. 7B and 7C, the UE 602 may determine to drop the symbols of the uplink transmission originally scheduled to be transmitted in the intervening subframe 722.

The UE 602 may transmit uplink transmissions 652 to the base station 604 and the base station 604 may receive the uplink transmissions 652 from the UE 602. As described above, the uplink transmissions 652 received by the base station 604 may not include the symbols originally scheduled for transmission on the conflicted symbols, and may or may not include the symbols originally scheduled for transmission on the non-conflicted symbols of the conflicted subframe.

In some aspects, as illustrated at 662, the base station 604 may determine whether the DM-RS received in the uplink transmissions 652 are bundled. This may be done as described above in connection with 552 of FIG. 5.

In some aspects, as illustrated at 664, where the uplink transmissions 652 include symbols on the non-conflicted symbols of the conflicted subframe, the base station 604 may decode the non-conflicted symbols of the conflicted subframe based on DM-RS of other subframes. For example, referring again to FIG. 7B, the DM-RS for the intervening subframe 722 was scheduled to be transmitted on the symbol 724. As the symbol 724 was a conflicted symbol, the UE 602 did not transmit DM-RS to the base station 604 in the intervening subframe 722. The base station 604 may estimate the channel based on bundled DM-RS received in symbol 714 of the first subframe 712 and symbol 734 of the second subframe 732, and may decode the symbols received on the non-conflicted symbols of the intervening subframe 722 based on the channel estimate from the bundled DM-RS of the first and second subframes 712 and 732.

In some aspects, as illustrated at 666, where the uplink transmissions 652 include symbols on the non-conflicted symbols of the conflicted subframe, the base station 604 may decode other subframes based on the DM-RS of the conflicted subframe. For example, referring again to FIG. 7C, the DM-RS for the uplink transmission on the intervening subframe was scheduled to be transmitted on the symbol 724. As symbol 724 is a non-conflicted symbol, the DM-RS for the intervening subframe 722 may be included in the uplink transmissions 652. The DM-RS for the intervening subframe 722, the DM-RS for the first subframe 712, and the DM-RS for the second subframe 732 may be bundled DM-RS, and the base station 604 may utilize the bundled DM-RS including the DM-RS for the intervening subframe 722 to estimate the channel for the first subframe 712 to decode the first subframe 712 and to estimate the channel for the second subframe 732 to decode the second subframe 732.

Figure 8:
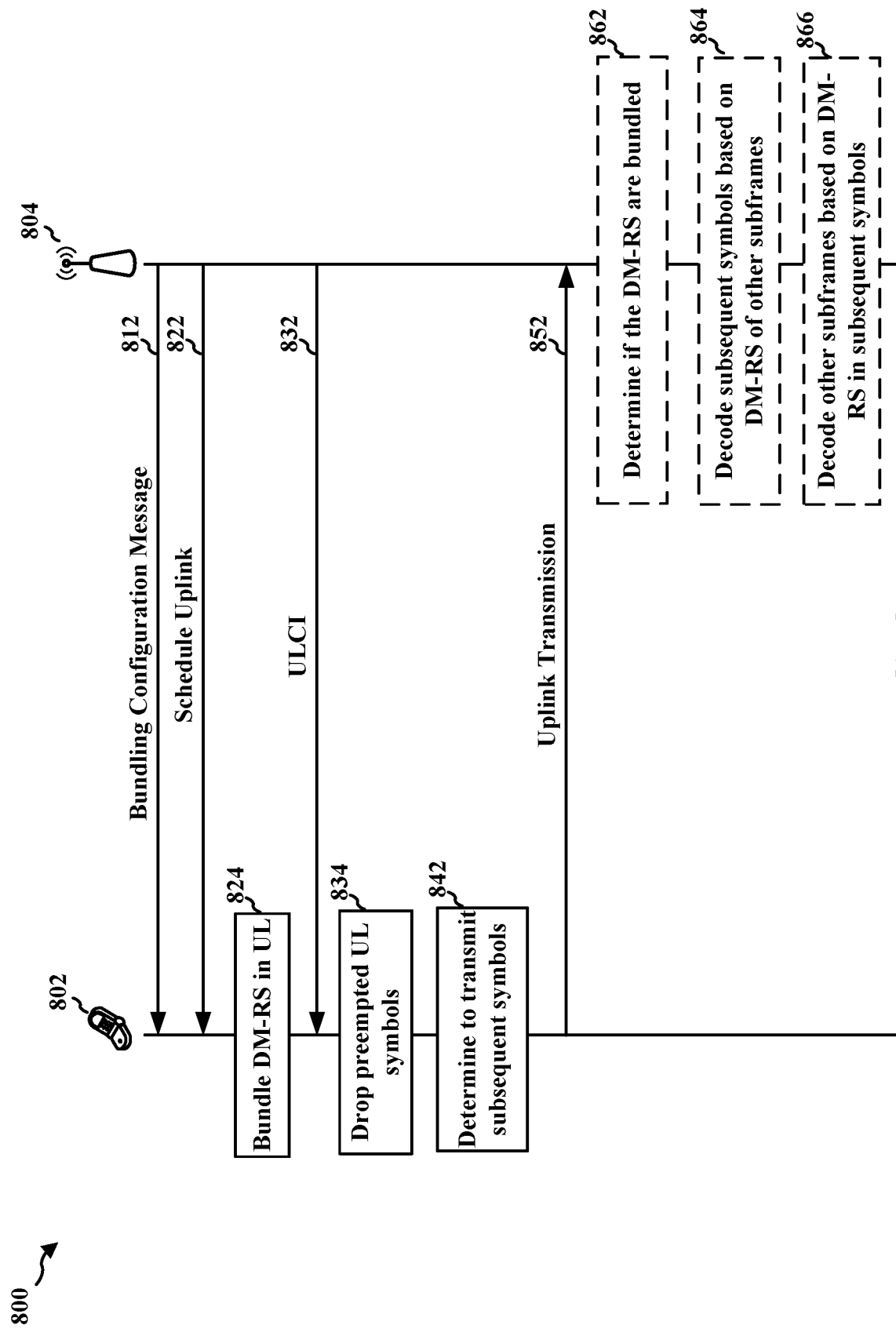
FIG. 8 is a communication flow diagram illustrating the use of bundled DM-RS in an uplink transmission with an inter- or intra-UE preemption conflict.

FIG. 8 is a communication flow diagram 800 illustrating the use of bundled DM-RS in uplink transmissions including an uplink transmission with an inter- or intra-UE preemption conflict. A base station 804 may transmit a bundling configuration message 812 to a UE 802 and the UE 802 may receive the bundling configuration message 812. The bundling configuration message 812 may indicate whether the base station 812 is configured for decoding uplink transmissions based on bundled DM-RS.

Figure 9A:
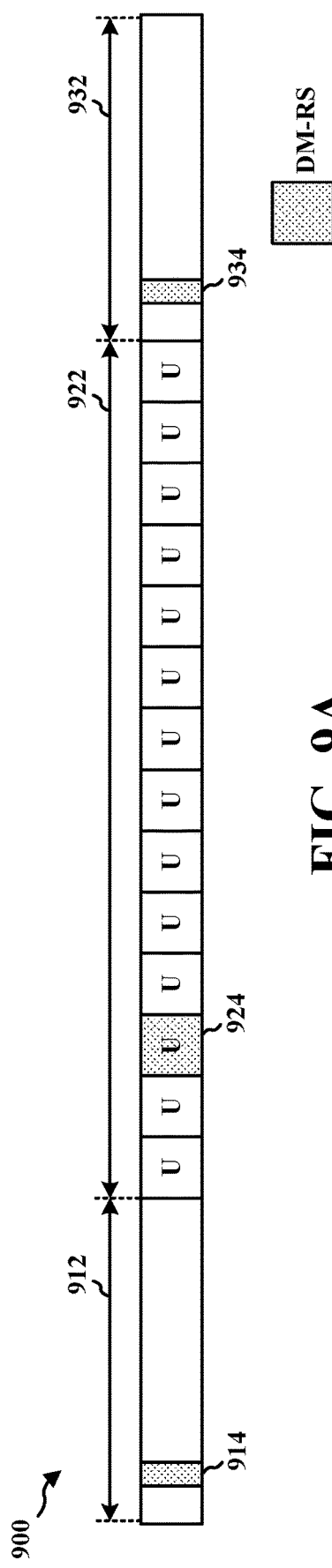
FIG. 9A is a diagram illustrating resources scheduled for uplink transmission.

The base station 804 may transmit a message 822 scheduling the UE 802 for uplink transmission on particular resources. For example, FIG. 9A is a diagram 900 illustrating resources scheduled for uplink transmissions. A first subframe 912, a second subframe 932, and an intervening subframe 922 between the first and second subframes 912 and 932 are contiguous. The message 822 may schedule the UE 802 to transmit uplink transmissions to the base station 804 during the first subframe 912, the second subframe 932, and the intervening subframe 922, including to transmit DM-RS at symbol 914 in the first subframe 912, at symbol 934 in the second subframe 932, and at symbol 924 in the intervening subframe 922. As illustrated in FIG. 9A, the UE 802 may be scheduled to transmit an uplink transmission to the base station 804 on each symbol of the intervening subframe 922. The UE 802 may generate an uplink transmission to be transmitted on the identified uplink resources.

As illustrated at 824, if the bundling configuration message 812 indicated that the base station 804 is configured to decode uplink transmissions utilizing bundled DM-RS, the UE 802 may determine to bundle the DM-RS for its uplink communication and may include bundled DM-RS in the uplink transmissions. For example, referring again to FIG. 9A, the UE 802 may generate the uplink transmissions with the DM-RS to be transmitted on symbols 814, 824, and 834 as bundled DM-RS.

In some aspects, the base station 804 may transmit a ULCI 832 to the UE 802 indicating that symbols previously scheduled for uplink by the UE 802 (e.g., a low-priority uplink) are being preempted by a high-priority transmission to or from another UE. The symbols being preempted may be referred to as preempted symbols, and an inter-UE prioritization conflict may be occurring for the preempted symbols. The symbols before the preempted symbols in the same subframe may be referred to as preceding symbols, and the symbols after the preempted symbols in the same subframe may be referred to as subsequent symbols. As illustrated at 842, the UE 802 may determine to drop the symbols of the uplink transmission that were to be transmitted on the preempted symbols.

In some aspects, the ULCI 832 may indicate that the symbols previously scheduled for uplink by the UE 802 are being preempted by a higher-priority transmission to or from the same UE 802. In such a case, an intra-UE prioritization conflict may be occurring for the preempted symbols. In some aspects, the UE 802 may detect the intra-UE prioritization conflict for the preempted symbols, and may not receive an indication such as ULCI from the base station 804.

As illustrated at 834, the UE 802 may determine to drop the symbols of the uplink transmission that were to be transmitted on the preempted symbols.

Figure 9B:
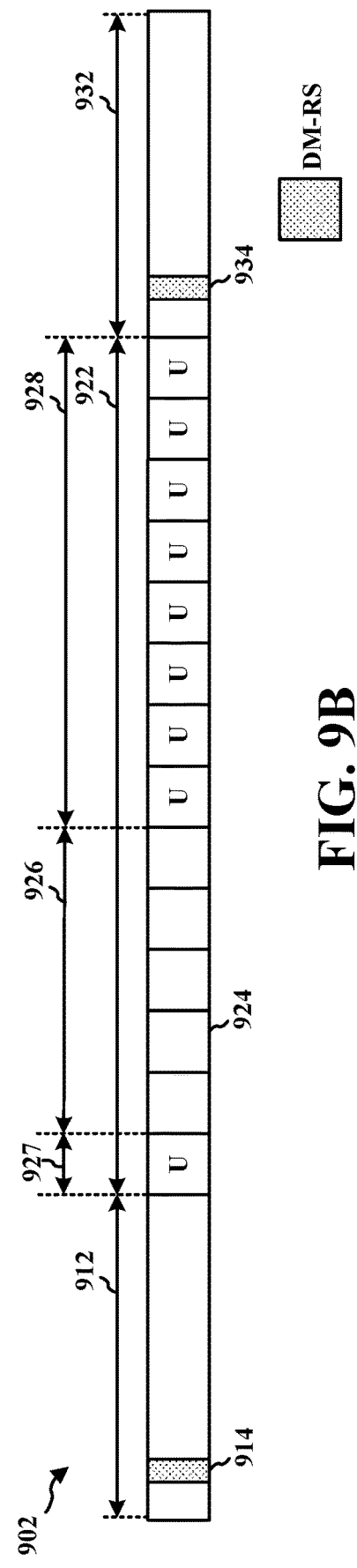
FIG. 9B is a diagram illustrating the subframes of FIG. 9A with symbols preempted by an inter-UE or intra-UE priority conflict.

For example, FIG. 9B is a diagram 902 illustrating the subframes of FIG. 9A with symbols preempted by an inter-UE or intra-UE priority conflict. In the example of FIG. 9B, an inter-UE or intra-UE priority conflict has preempted the second, third, fourth, fifth, and sixth symbols of the intervening subframe 922. Accordingly, the second, third, fourth, fifth, and sixth symbols are preempted symbols 926, the first symbol is the preceding symbol 927, and the remaining symbols are the subsequent symbols 928. As the preempted symbols 926 include the symbol 924 where the UE 802 was scheduled to transmit the DM-RS for the intervening subframe 922, the UE 802 is no longer scheduled to uplink DM-RS during the intervening subframe 922.

As illustrated at 842, the UE 802 may determine whether to transmit the subsequent symbols of the uplink transmission. The UE 802 may determine whether to do so based on the bundling configuration message 812. If the bundling configuration message 812 indicated that the base station 804 is configured to decode uplink transmissions using bundled DM-RS, the UE 802 may determine to transmit the uplink transmission on the subsequent symbols. For example, in FIG. 9B, the UE 802 may determine to transmit the uplink transmission on the subsequent symbols 928.

If the bundling configuration message 812 did not indicate that the base station 804 is configured to decode uplink transmissions using bundled DM-RS, or if the UE 802 did not receive a bundling configuration message 812 from the base station 804, the UE 602 may determine to transmit the uplink transmission on the preceding symbols but to drop the uplink transmission on the subsequent symbols. For example, in FIG. 9B, the UE 802 may determine to drop the symbols of the uplink transmission originally scheduled to be transmitted on the subsequent symbols 928.

The UE 802 may transmit the uplink transmissions 852 to the base station 804 and the base station 804 may receive the uplink transmissions 852 from the UE 802. As described above, the uplink transmissions 852 received by the base station 804 may not include the symbols originally scheduled for transmission on the preempted symbols, and may or may not include the symbols originally scheduled for transmission on the subsequent symbols of the same subframe.

In some aspects, as illustrated at 862, the base station 804 may determine whether the DM-RS received in the uplink transmissions 852 are bundled. This may be done as described above in connection with 552 of FIG. 5.

In some aspects, as illustrated at 864, where the uplink transmissions 852 include symbols on the subsequent symbols, the base station 804 may decode the subsequent symbols of the conflicted subframe based on DM-RS of other subframes. For example, referring again to FIG. 9B, the DM-RS for the intervening subframe 822 was scheduled to be transmitted on the symbol 824. As the symbol 824 was a preempted symbol, the UE 802 did not transmit DM-RS to the base station 804 in the intervening subframe 822. The base station 804 may estimate the channel based on bundled DM-RS received in symbol 814 of the first subframe 812 and symbol 834 of the second subframe 832, and may decode the symbols received on the subsequent symbols 928 of the intervening subframe 822 based on the channel estimate from the bundled DM-RS of the first and second subframes 812 and 832.

In some aspects, as illustrated at 866, where the uplink transmissions 852 include symbols on the non-conflicted symbols of the conflicted subframe, the base station 804 may decode other subframes based on the DM-RS transmitted in the subsequent symbols. For example, the DM-RS for the subframe with the preempted symbols may have been originally scheduled for transmission on the subsequent symbols. Because the UE 802 transmitted the subsequent symbols to the base station 804 in the uplink transmissions 852, the base station 804 may receive the DM-RS for the subframe with the preempted symbols. The DM-RS received on the subsequent symbols may be bundled with the DM-RS received on other subframes, such as the subframes immediately before and/or immediately after the subframe with the preempted symbols, and the base station 804 may utilize the bundled DM-RS including the DM-RS received on the subsequent symbols to estimate the channel for each channel and to decode each channel.

In some aspects, a UE may utilize bundled DM-RS to decode a transmission from a base station and the base station may experience an interruption event. The interruption event may be a TDD conflict, may be an inter-UE prioritization conflict signaled by downlink preemption indication (DLPI), or may be an intra-UE prioritization conflict, such as the base station scheduling a high priority PDSCH for the UE on resources previously allocated to a low-priority PDSCH for the UE. The base station may transmit capability signaling, e.g., as an RRC message. The base station may transmit different capability signaling for different downlink component carriers (DL CC). In some aspects, the UE may utilize DM-RS to decode the transmission from the base station where the base station experienced an interruption event as described above with respect to a base station utilizing DM-RS to decode a transmission from a UE where the UE experienced an interruption event. In some aspects, the base station may transmit the bundled DM-RS to the UE after experiencing the interruption event as described above with respect to a UE transmitting bundled DM-RS to a base station after experiencing an interruption event.

Uplink transmissions have been described above as being transmitted in subframes. This is one illustrative aspect of the present disclosure. In some aspects, other time intervals for uplink transmissions may be used. For example, in some aspects, the time interval may be a slot or may be a sub slot. The above disclosure may also be applicable where the time interval for an uplink is an interval other than a subframe, such as where the time interval is a slot or where the time interval is a sub slot.

Figure 11:
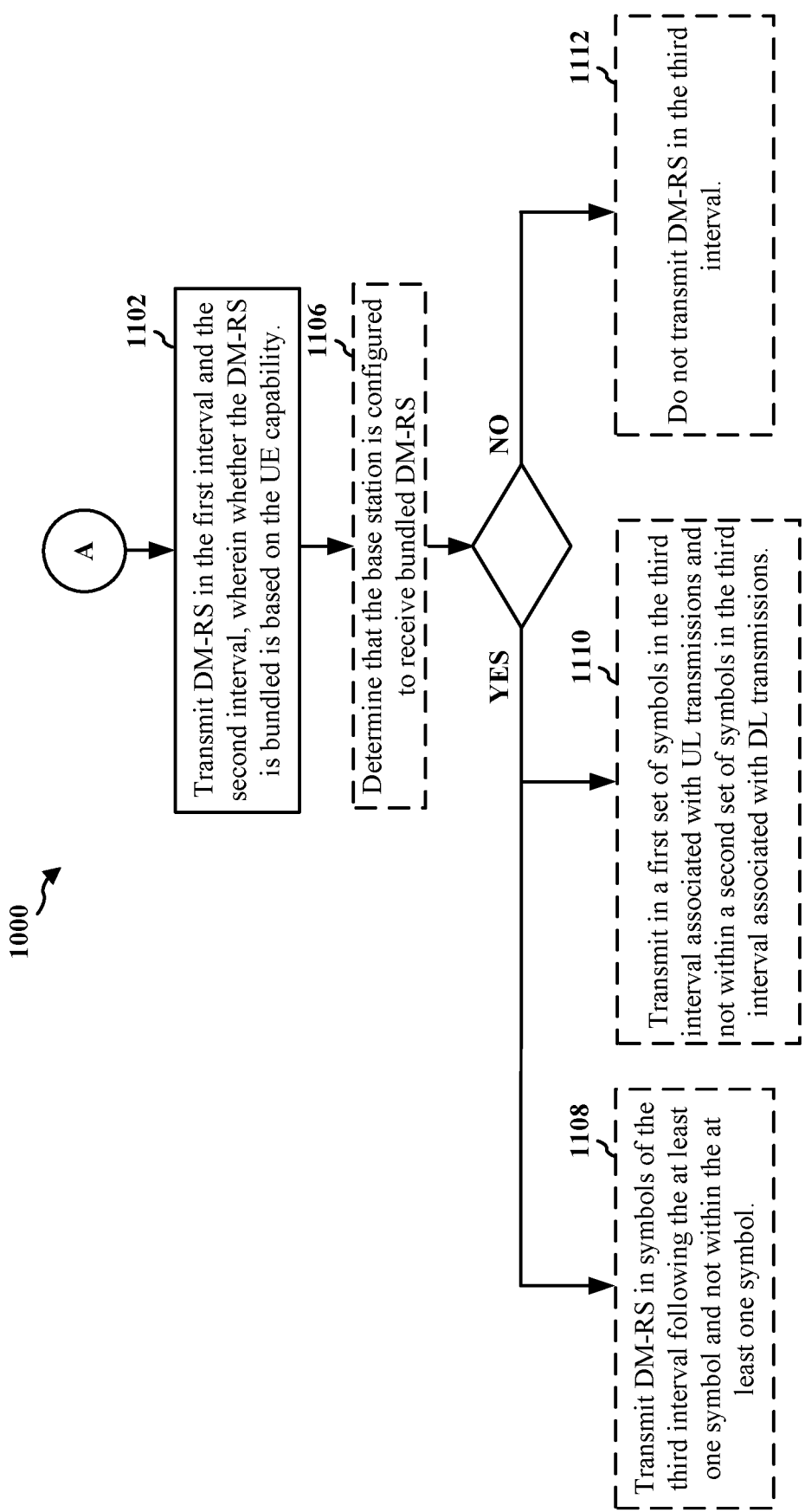

FIGS. 10 and 11 are a flowchart 1000 of a method of wireless communication. The method may be performed by a UE (e.g., the UE 350, 502, 602, 802; the apparatus 1202/1202'; the processing system 1314, which may include the memory 360 and which may be the entire UE 350 or a component of the UE 350, such as the TX processor 368, the RX processor 356, and/or the controller/processor 359).

In some aspects, at 1002, the UE may receive a DM-RS bundling configuration message from a base station. For example, 1002 may be performed by the bundled DM-RS component 1208.

At 1004, the UE transmits capability signaling information to the base station. For example, 1004 may be performed by the capability signaling information component 1206. The capability signaling information is associated with a UE capability of the UE for DM-RS bundling. The capability signaling information may include information indicating a number of symbols the UE can drop within a time interval while maintaining bundling of the DM-RS across the time interval.

At 1006, the UE determines to transmit bundled DM-RS to the base station within a plurality of uplink transmissions. For example, 1006 may be performed by the bundled DM-RS component 1208. The uplink transmissions are within a time interval including a first interval corresponding to a first uplink transmission of the plurality of uplink transmissions, a second interval corresponding to a second uplink transmission of the plurality of uplink transmissions, and an third interval corresponding to an third uplink transmission of the plurality of uplink transmissions. The third interval may be an intervening interval, and may be between the first interval and the second interval. Determining to transmit bundled DM-RS in the time interval may include determining to transmit the DM-RS with the same phase coherence in a same set of subcarriers with a same power and in a same UL beam in the time interval. The time interval may be a set of contiguous subframes, the first interval may be a first subframe, the second interval may be a second subframe, and the third interval may be one or more third subframe. The time interval may be a set of contiguous slots or sub-slots, the first interval may be a first slot or sub-slot, the second interval may be a second slot or sub-slot, and the third interval may be one or more third slot or sub-slot.

The UE capability may include a number of symbols, the DM-RS may be transmitted in the second interval bundled when a number of the at least one dropped symbol is less than the number of symbols in the UE capability, and the DM-RS may be transmitted un-bundled when the number of the at least one dropped symbol is greater than the number of symbols in UE capability. The capability signaling information may include a plurality of different DM-RS bundling capabilities associated with at least one of a TDD conflict, an inter-UE prioritization, and an intra-UE prioritization. A bundling capability of the plurality of different DM-RS bundling capabilities may indicate whether the UE can maintain bundling of the DM-RS across the time interval when the determination to drop the at least one symbol is based on the associated TDD conflict, inter-UE prioritization, or intra-UE prioritization. Each bundling capability of the plurality of different DM-RS bundling capabilities may include a number of symbols, the number of symbols being a number of symbols the UE can drop while maintaining bundling of the DM-RS across the time interval when the determination to drop the at least one symbol is based on the associated TDD conflict, inter-UE prioritization, or intra-UE prioritization.

At 1010, the UE determines to drop at least one symbol within the third interval. For example, 1010 may be performed by the symbol drop component 1212.

In some aspects, at 1008, prior to 1010, the UE may receive an indication to drop the at least one symbol within the third interval. For example, 1008 may be performed by the symbol drop component 1212. The UE may receive the indication from the base station. The indication may be associated with one of a TDD conflict, an inter-UE prioritization, or an intra-UE prioritization. The determination to drop the at least one symbol at 1010 may be based on the received indication.

At 1102, the UE transmits DM-RS in the first interval and the second interval. For example, 1102 may be performed by the uplink transmission component 1214. Whether the DM-RS in the second interval is transmitted such that the DM-RS in the second interval is bundled with the DM-RS in the first interval is based on the UE capability.

In some aspects, at 1106, the UE may determine that the base station is configured to receive bundled DM-RS. For example, 1106 may be performed by the bundled DM-RS component 1208. The UE may make the determination based on a DM-RS bundling configuration message received at 1002.

In some aspects, the indication may be associated with the TDD conflict, a first set of symbols within in the third interval may be associated at least with uplink transmissions, and a second set of symbols within the third interval may include the at least one symbol and may be associated at least with downlink transmissions. In such aspects, at 1108, the UE may transmit a portion of the third transmission in the first set of symbols and not in the second set of symbols upon determining at 1106 that the base station is configured to receive bundled DM-RS. In some aspects, the portion of the third transmission may include DM-RS. The first set of symbols may include flex symbols associated with uplink or downlink. The second set of symbols may include flex symbols associated with uplink or downlink. In some aspects, the UE may determine to transmit the portion of the third transmission in the first set of symbols when the UE capability is less than a number of symbols in the at least one symbol and is greater than a number of symbols in the second set of symbols.

In some aspects, the indication may be associated with the inter-UE prioritization or the intra-UE prioritization. In such aspects, at 1110, the UE may transmit DM-RS in symbols following the at least one symbol within the third interval and not in the at least one symbol. The DM-RS transmitted in the symbols following the at least one symbol may be bundled with the DM-RS in the first interval and the DM-RS in the second interval.

In some aspects, at 1112, the UE may not transmit DM-RS in the third interval upon determining that the base station is not configured to receive bundled DM-RS.

Figure 12:
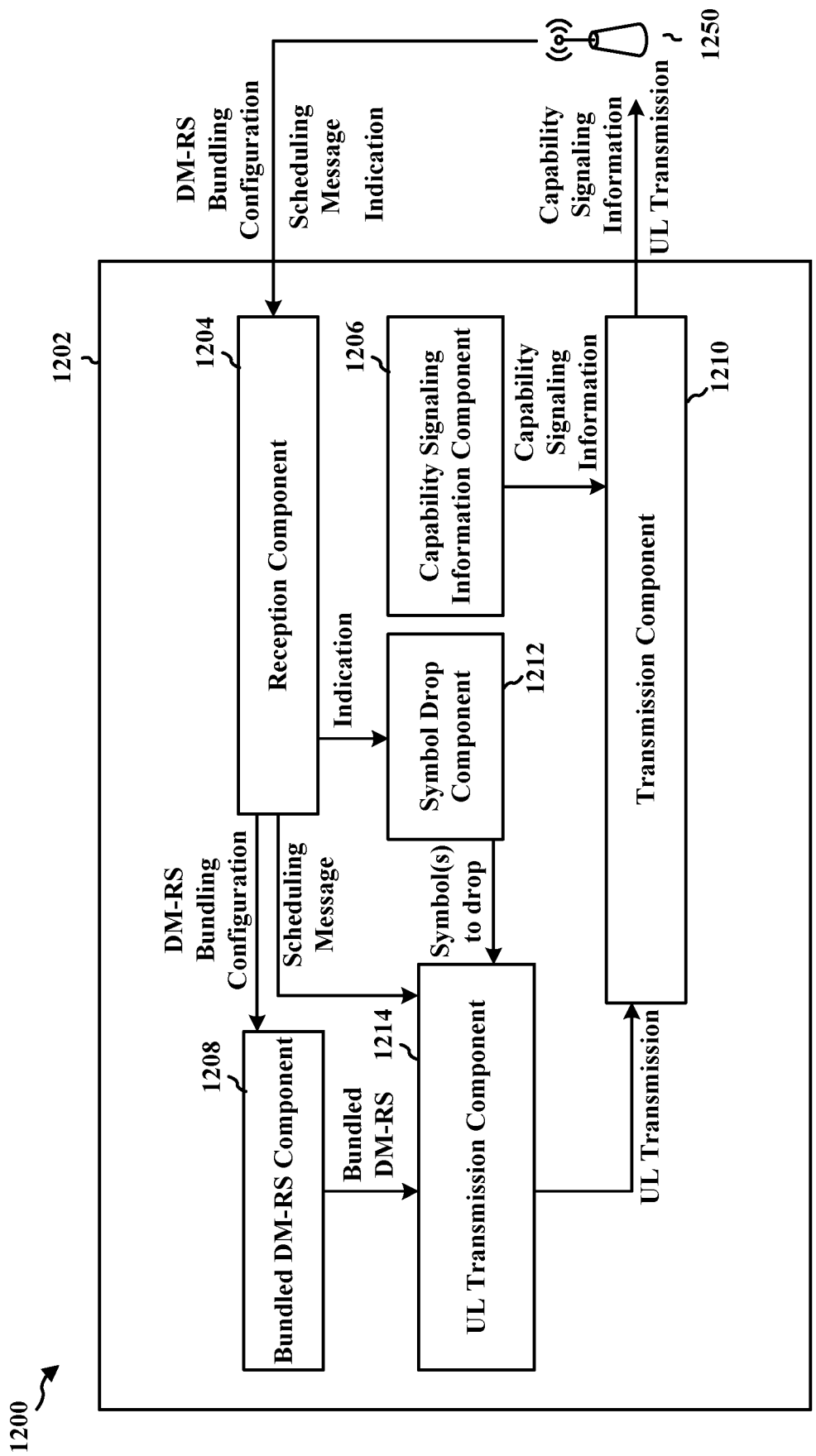
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a UE. The UE includes a capability signaling information component 1206 that transmits capability signaling information to a base station 1250, such as through a transmission component 1210, e.g., as described in connection with 1004. The apparatus includes a bundled DM-RS component 1208 that determines to transmit bundled DM-RS to the base station 1250, such as through the transmission component 1210, e.g., as described in connection with 1006. In some aspects, the bundled DM-RS component 1208 may receive a DM-RS bundling configuration message from the base station 1250, such as through the reception component 1204, e.g., as described in connection with 1002. The apparatus includes a symbol drop component 1212 that determines to drop at least one symbol within the third interval, e.g., as described in connection with 1010. In some aspects, the symbol drop component 1212 may receive an indication from the base station 1250, such as through reception component 1204, e.g., as described in connection with 1008. The apparatus includes an uplink transmission component 1214 that transmits DM-RS in the first interval and the second interval, wherein whether the DM-RS is bundled is based on the UE capability, such as through the transmission component 1210, e.g., as described in connection with 1102. The uplink transmission component 1214 may receive a scheduling message from the base station 1250, bundled DM-RS from the bundled DM-RS component 1208, and one or more symbol to drop from the symbol drop component 1212, and may generate the UL transmission based on the scheduling message, the bundled DM-RS, and the one or more symbols to drop.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
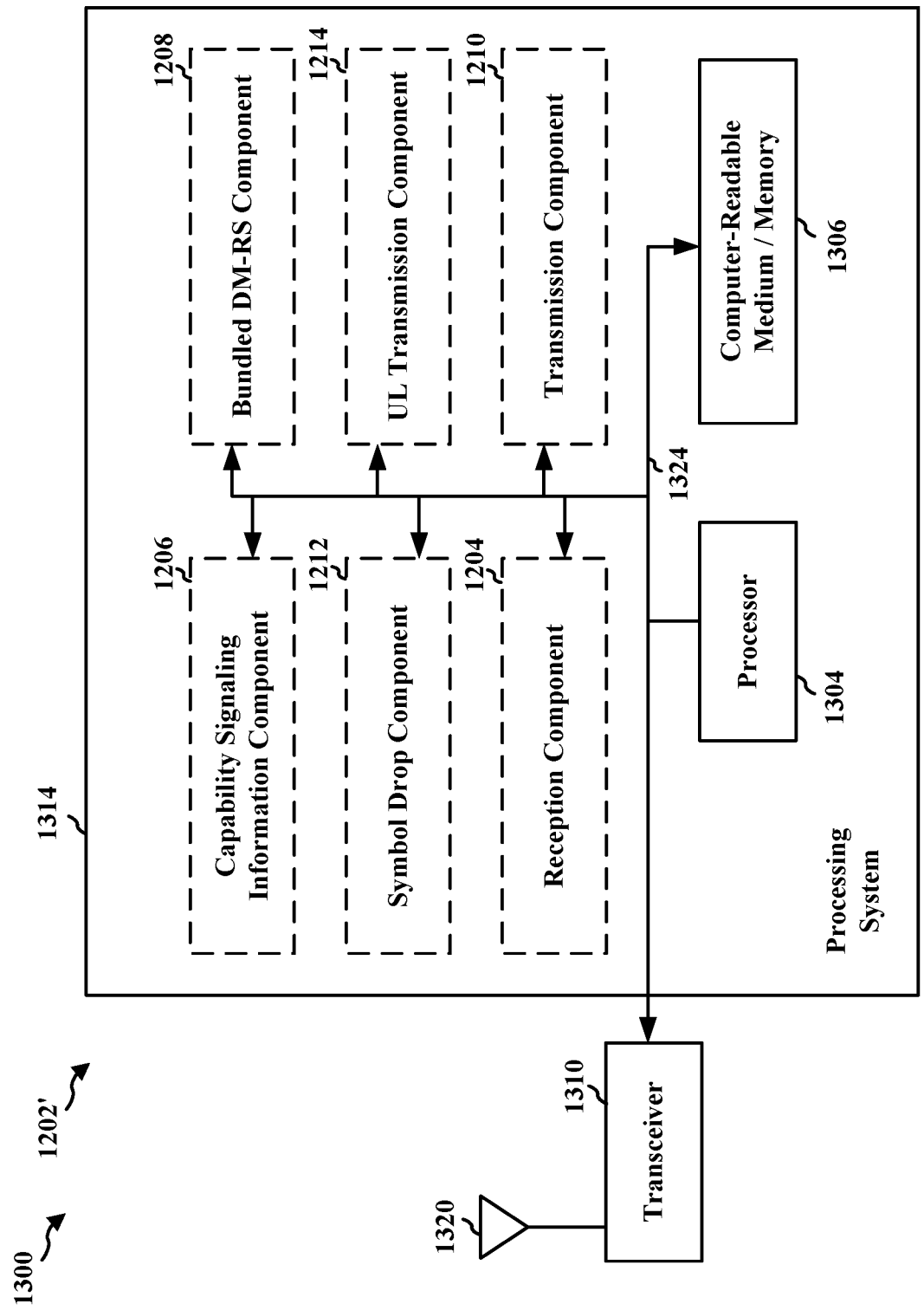
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359. Alternatively, the processing system 1314 may be the entire UE (e.g., see 350 of FIG. 3).

In one configuration, the apparatus 1202/1202' for wireless communication includes means for transmitting capability signaling information to a base station associated with a UE capability of the UE for demodulation reference signals (DM-RS) bundling, means for determining to transmit bundled DM-RS to the base station within a plurality of uplink transmissions within a time interval, the time interval comprising a first interval corresponding to a first uplink transmission of the plurality of uplink transmissions, a second interval corresponding to a second uplink transmission of the plurality of uplink transmissions, and an third interval between the first interval and the second interval corresponding to an third uplink transmission of the plurality of uplink transmissions, means for determining to drop the uplink transmission in at least one symbol within the third interval, and means for transmitting DM-RS in the first interval and the second interval, wherein whether the DM-RS in the second interval is transmitted such that the DM-RS in the second interval is bundled with the DM-RS in the first interval is based on the UE capability. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
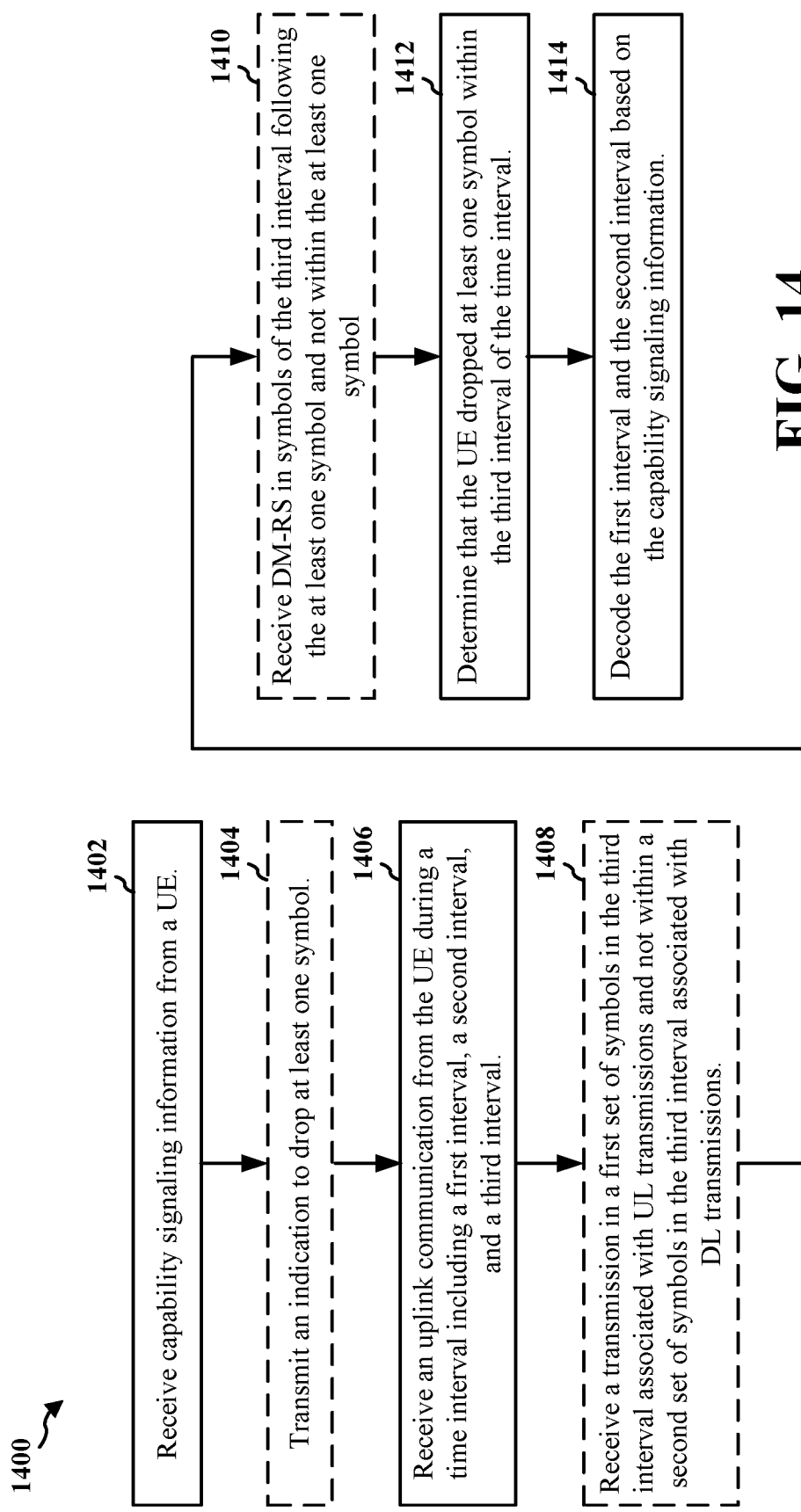
FIG. 14 is a flowchart of a method of wireless communication.

FIG. 14 is a flowchart 1400 of a method of wireless communication. The method may be performed by a base station (e.g., the base station 310, 504, 604, 804; the apparatus 1502/1502'; the processing system 1614, which may include the memory 376 and which may be the entire base station 310 or a component of the base station 310, such as the TX processor 316, the RX processor 370, and/or the controller/processor 375).

At 1402, the base station receives capability signaling information from a UE. For example, 1402 may be performed by the capability signaling information component 1506.

In some aspects, at 1404, the base station may transmit an indication to drop the at least one symbol. The indication may be associated with one of a TDD conflict, an inter-UE prioritization, or an intra-UE prioritization.

At 1406, the base station receives an uplink communication from the UE. For example, 1406 may be performed by uplink reception component 1508. The uplink communication includes a time interval which includes a first interval corresponding to a first uplink transmission, a second interval corresponding to a second uplink transmission, and an third interval corresponding to an third uplink transmission. The third interval may be an intervening interval, and may be between the first interval and the second interval. The uplink communication further includes DM-RS in the first and second intervals. The time interval may be a set of contiguous subframes, the first interval may be a first subframe, the second interval may be a second subframe, and the third interval may be one or more third subframe. The time interval may be a set of contiguous slots or sub-slots, the first interval may be a first slot or sub-slot, the second interval may be a second slot or sub-slot, and the third interval may be one or more third slot or sub-slot.

The capability signaling information may include information indicating a number of symbols the UE can drop within the time interval while maintaining bundling of the DM-RS across the time interval. The capability signaling information may include a plurality of different DM-RS bundling capabilities associated with at least one of a TDD conflict, an inter-UE prioritization, and an intra-UE prioritization. A bundling capability of the plurality of different DM-RS bundling capabilities may indicate whether the UE can maintain bundling of the DM-RS across the time interval when the UE dropped the at least one symbol based on the associated TDD conflict, inter-UE prioritization, or intra-UE prioritization. A bundling capability of the plurality of different DM-RS bundling capabilities may include a number of symbols, the number of symbols being a number of symbols the UE can drop while maintaining bundling of the DM-RS across the time interval when UE dropped the at least one symbol based on the associated TDD conflict, inter-UE prioritization, or intra-UE prioritization.

In some aspects, the indication may be associated with the TDD conflict, a first set of symbols within in the third interval may be associated at least with uplink transmissions, and a second set of symbols within the third interval may include the at least one symbols and may be associated at least with downlink transmissions. In some aspects, at 1408, the base station may receive a portion of the third transmission in the first set of symbols from the UE and not in the second set of symbols from the UE. For example, 1408 may be performed by the uplink reception component 1508. In some aspects, the portion of the third transmission may include DM-RS. The portion of the third transmission transmitted in the first set of symbols may be bundled with the DM-RS in the first interval and the DM-RS in the second interval. The first set of symbols may include flex symbols associated with uplink or downlink. The second set of symbols may include flex symbols associated with uplink or downlink. The DM-RS may be received in the first set of symbols when the UE capability is less than a number of symbols in the at least one symbol and is greater than a number of symbols in the second set of symbols.

In some aspects, the indication may be associated with the inter-UE prioritization or the intra-UE prioritization, and at 1410, the base station may receive DM-RS in symbols following the at least one symbol within the third interval from the UE and not in the at least one symbol from the UE. For example, 1408 may be performed by the uplink reception component 1508. The DM-RS received in the symbols following the at least one symbol may be bundled with the DM-RS in the first interval and the DM-RS in the second interval.

At 1412, the base station determines that the UE dropped at least one symbol within the third interval. For example, 1412 may be performed by symbol drop component 1512.

At 1414, the base station decodes the first interval and the second interval. For example, 1414 may be performed by the decoder component 1514. Whether the DM-RS in the second interval is utilized for decoding the first interval and whether the DM-RS in the first interval is utilized for decoding the second interval is based on the capability signaling information.

Figure 15:
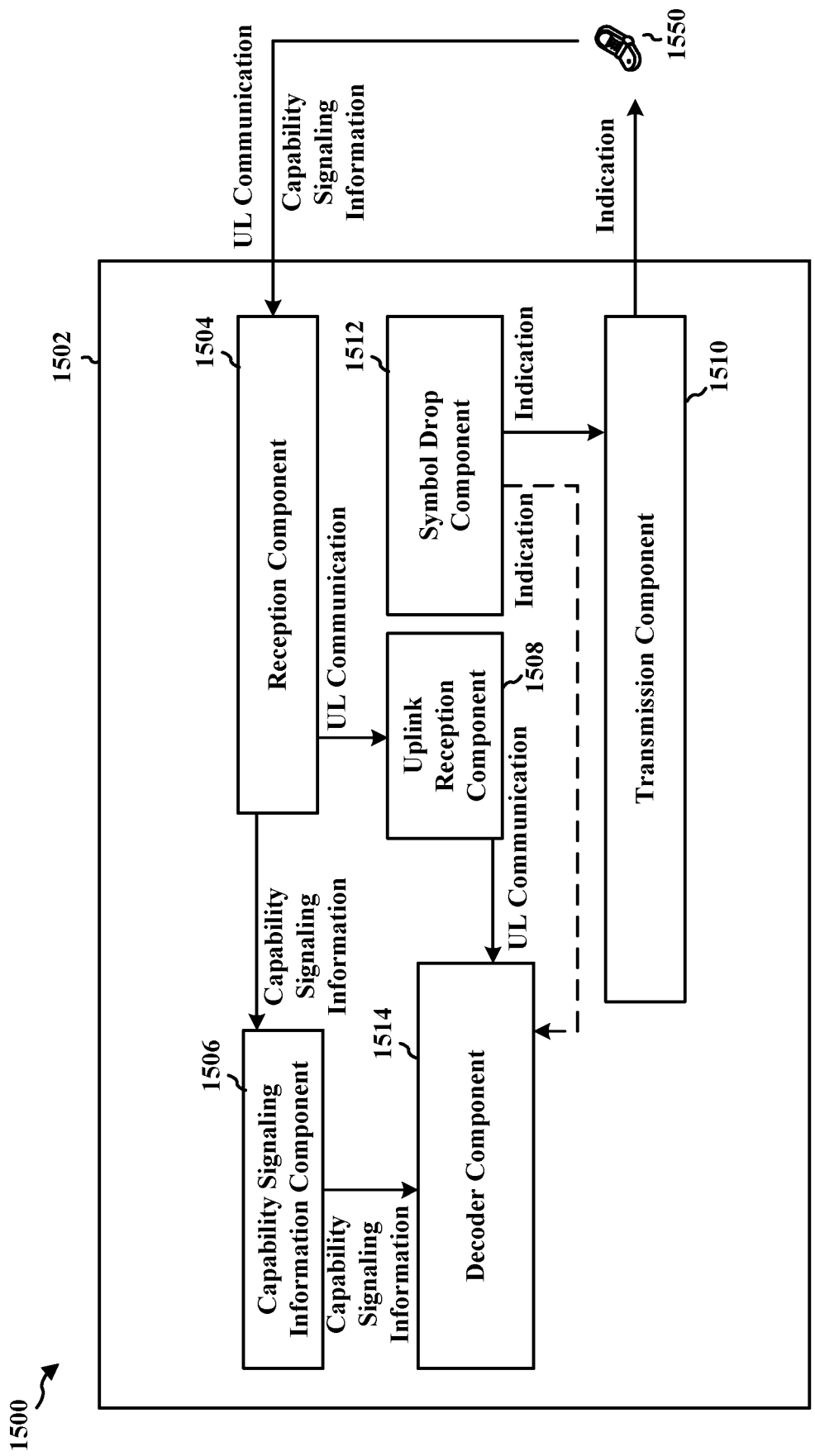
FIG. 15 is a conceptual data flow diagram illustrating the data flow between different means/components in an example apparatus.

FIG. 15 is a conceptual data flow diagram 1500 illustrating the data flow between different means/components in an example apparatus 1502. The apparatus may be a base station. The apparatus includes a capability signaling information component 1506 that receives capability signaling information from a UE 1550, such as through a reception component 1504, e.g., as described in connection with 1402. The apparatus includes an uplink reception component 1508 that receives an uplink communication from the UE 1550, such as through the reception component 1504, e.g., as described in connection with 1406. The apparatus further includes a symbol drop component 1512 that determines that the UE 1550 dropped at least one symbol within the third interval of the time interval, such as described in connection with 1412. For example, the symbol drop component 1412 may determine that the UE 1550 dropped at least on symbol by transmitting an indication to the UE 1550, such as through transmission component 1510, causing an interruption event or alerting the UE 1550 to an interruption event. In some aspects, the symbol drop component 1512 may transmit the indication to the UE 1550 and to a decoder component 1514, and the decoder component 1514 may determine that the UE 1550 dropped at least one symbol in the third interval of the time interval as described in connection with 1412. The apparatus also includes the decoder component 1514 that decodes the first interval and the second interval based on the capability signaling information, e.g., as described in connection with 1514. The decoder component 1514 may receive the capability signaling information from the capability signaling information component 1506 and the uplink communication from the uplink reception component 1508.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
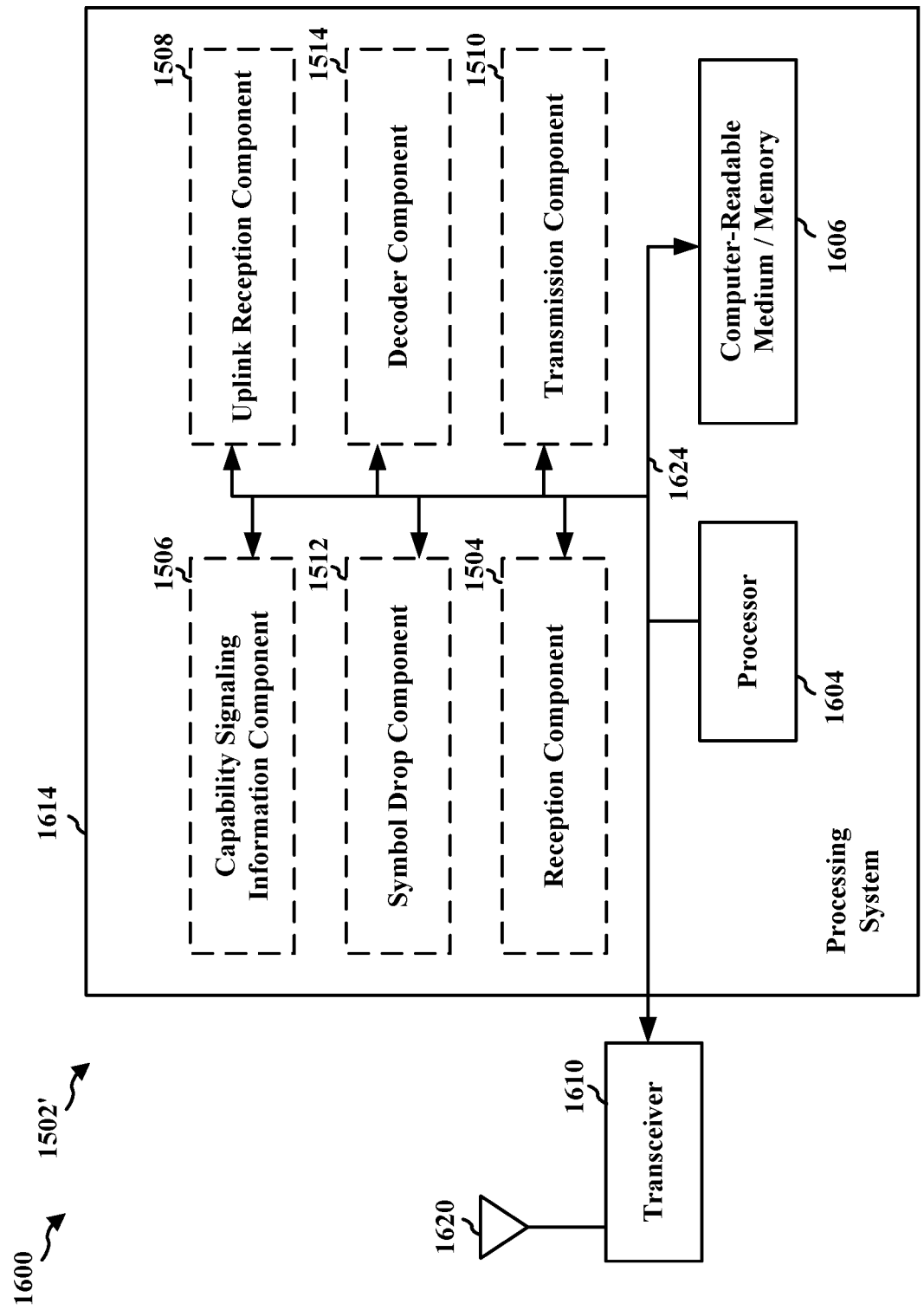
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1510, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512, and 1514. The components may be software components running in the processor 1604, resident/stored in the computer readable medium/memory 1606, one or more hardware components coupled to the processor 1604, or some combination thereof. The processing system 1614 may be a component of the base station 310 and may include the memory 376 and/or at least one of the TX processor 316, the RX processor 370, and the controller/processor 375. Alternatively, the processing system 1614 may be the entire base station (e.g., see 310 of FIG. 3).

In one configuration, the apparatus 1502/1502' for wireless communication includes means for receiving capability signaling information from a UE, means for receiving an uplink communication from the UE, the uplink communication comprising a time interval comprising a first interval, a second interval, and an third interval between the first interval and the second interval, the uplink communication further comprising DM-RS in the first and second intervals, means for determining that the UE dropped at least one symbol within the third interval, and means for decoding the first interval and the second interval, wherein whether the DM-RS in the second interval is utilized for decoding the first interval and whether the DM-RS in the first interval is utilized for decoding the second interval is based on the capability signaling information. The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication of a wireless device at a user equipment (UE) comprising:
    transmitting capability signaling information to a base station associated with a UE capability of the UE for demodulation reference signals (DM-RS) bundling;
    determining whether to transmit bundled DM-RS to the base station within a plurality of uplink transmissions within a time interval, the time interval comprising a first interval corresponding to a first uplink transmission of the plurality of uplink transmissions, a second interval corresponding to a second uplink transmission of the plurality of uplink transmissions, and a third interval corresponding to a third uplink transmission of the plurality of uplink transmissions;
    determining to drop at least one symbol within the third interval; and
    transmitting DM-RS in the first interval and the second interval, wherein whether the DM-RS in the second interval is transmitted such that the DM-RS in the second interval is bundled with the DM-RS in the first interval is based on the UE capability and whether the at least one symbol within the third interval is dropped.

2. The method of claim 1, wherein the third interval is between the first interval and the second interval.

3. The method of claim 1, wherein the capability signaling information comprises information indicating a number of symbols the UE can drop within the time interval while maintaining bundling of the DM-RS across the time interval.

4. The method of claim 1, wherein the capability signaling information comprises a plurality of different DM-RS bundling capabilities associated with at least one of a time division duplex (TDD) conflict, an inter-UE prioritization, and an intra-UE prioritization.

5. The method of claim 1, wherein the determining whether to transmit bundled DM-RS in the time interval comprises determining whether to transmit the DM-RS with the same phase coherence in a same set of subcarriers in the time interval.

6. The method of claim 1, comprising:
    receiving an indication to drop the at least one symbol within the third interval, the indication being associated with one of a time division duplex (TDD) conflict, an inter-UE prioritization, or an intra-UE prioritization, wherein the determination to drop the at least one symbol is based on the received indication.

7. The method of claim 6, wherein the indication is associated with the TDD conflict, wherein a first set of symbols within in the third interval is associated at least with uplink transmissions, and wherein a second set of symbols within the third interval comprises the at least one symbol and is associated at least with downlink transmissions, the method further comprising:
    transmitting a portion of the third transmission in the first set of symbols and not in the second set of symbols, the portion of the third transmission transmitted in the first set of symbols being bundled with the DM-RS in the first interval and the DM-RS in the second interval.

8. The method of claim 7, further comprising:
    receiving a DM-RS bundling configuration message from the base station; and determining that the base station is configured to receive bundled DM-RS, wherein the UE transmits the DM-RS in the first set of symbols and not in the second set of symbols upon determining that the base station is configured to receive bundled DM-RS.

9. The method of claim 6, wherein the indication is associated with the inter-UE prioritization or the intra-UE prioritization, the method further comprising:
transmitting DM-RS in a symbol following the at least one symbol and not in the at least one symbol, the symbol following the at least one symbol being within the third interval, the DM-RS transmitted in the symbol following the at least one symbol being bundled with the DM-RS in the first interval and the DM-RS in the second interval.

10. The method of claim 9, further comprising:
receiving a DM-RS bundling configuration message from the base station; and
determining that the base station is configured to receive bundled DM-RS, wherein the UE transmits the DM-RS in the symbol following the at least one symbol upon determining that the base station is configured to receive bundled DM-RS.

11. An apparatus for wireless communication at a user equipment (UE), comprising:
a memory; and
at least one processor coupled to the memory and configured to:
transmit capability signaling information to a base station associated with a UE capability of the UE for demodulation reference signals (DM-RS) bundling;
determine whether to transmit bundled DM-RS to the base station within a plurality of uplink transmissions within a time interval, the time interval comprising a first interval corresponding to a first uplink transmission of the plurality of uplink transmissions, a second interval corresponding to a second uplink transmission of the plurality of uplink transmissions, and a third interval corresponding to a third uplink transmission of the plurality of uplink transmissions;
determine to drop at least one symbol within the third interval; and
transmit DM-RS in the first interval and the second interval, wherein whether the DM-RS in the second interval is transmitted such that the DM-RS in the second interval is bundled with the DM-RS in the first interval is based on the UE capability and whether the at least one symbol within the third interval is dropped.

12. The apparatus of claim 11, wherein the third interval is between the first interval and the second interval.

13. The apparatus of claim 11, wherein the capability signaling information comprises information indicating a number of symbols the UE can drop within the time interval while maintaining bundling of the DM-RS across the time interval.

14. The apparatus of claim 11, wherein the capability signaling information comprises a plurality of different DM-RS bundling capabilities associated with at least one of a time division duplex (TDD) conflict, an inter-UE prioritization, and an intra-UE prioritization.

15. The apparatus of claim 11, wherein the determining whether to transmit bundled DM-RS in the time interval comprises determining whether to transmit the DM-RS with the same phase coherence in a same set of subcarriers in the time interval.

16. The apparatus of claim 11, wherein the at least one processor is further configured to:
receive an indication to drop the at least one symbol within the third interval, the indication being associated with one of a time division duplex (TDD) conflict, an inter-UE prioritization, or an intra-UE prioritization, wherein the determination to drop the at least one symbol is based on the received indication.

17. The apparatus of claim 16, wherein the indication is associated with the TDD conflict, wherein a first set of symbols within in the third interval is associated at least with uplink transmissions, wherein a second set of symbols within the third interval comprises the at least one symbol and is associated at least with downlink transmissions, and wherein the at least one processor is further configured to:
transmit a portion of the third transmission in the first set of symbols and not in the second set of symbols, the portion of the third transmission transmitted in the first set of symbols being bundled with the DM-RS in the first interval and the DM-RS in the second interval.

18. The apparatus of claim 17, wherein the at least one processor is further configured to:
receive a DM-RS bundling configuration message from the base station; and
determine that the base station is configured to receive bundled DM-RS, wherein the UE transmits the DM-RS in the first set of symbols and not in the second set of symbols upon determining that the base station is configured to receive bundled DM-RS.

19. The apparatus of claim 16, wherein the indication is associated with the inter-UE prioritization or the intra-UE prioritization, and wherein the at least one processor is further configured to:
transmit DM-RS in a symbol following the at least one symbol and not in the at least one symbol, the symbol following the at least one symbol being within the third interval, the DM-RS transmitted in the symbols following the at least one symbol being bundled with the DM-RS in the first interval and the DM-RS in the second interval.

20. The apparatus of claim 19, wherein the at least one processor is further configured to:
receive a DM-RS bundling configuration message from the base station; and
determine that the base station is configured to receive bundled DM-RS, wherein the UE transmits the DM-RS in the symbol following the at least one symbol upon determining that the base station is configured to receive bundled DM-RS.

21. A method for wireless communication of a wireless device at a base station comprising:
receiving capability signaling information from a user equipment (UE);
receiving an uplink communication from the UE, the uplink communication comprising a time interval comprising a first interval corresponding to a first uplink transmission, a second interval corresponding to a second uplink transmission, and a third interval corresponding to a third uplink transmission, the uplink communication further comprising DM-RS in the first and second intervals;
determining that the UE dropped at least one symbol within the third interval; and
decoding the first interval and the second interval, wherein whether the DM-RS in the second interval is utilized for decoding the first interval and whether the DM-RS in the first interval is utilized for decoding the second interval is based on the capability signaling information.

22. The method of claim 21, wherein the capability signaling information comprises information indicating a number of symbols the UE can drop within the time interval while maintaining bundling of the DM-RS across the time interval.

23. The method of claim 21, further comprising transmitting an indication to drop the at least one symbol, the indication being associated with one of a time division duplex (TDD) conflict, an inter-UE prioritization, or an intra-UE prioritization.

24. The method of claim 23, wherein the indication is associated with the TDD conflict, wherein a first set of symbols within in the third interval is associated at least with uplink transmissions, and wherein a second set of symbols within the third interval comprises the at least one symbols and is associated at least with downlink transmissions, the method further comprising:
receiving a portion of the third transmission in the first set of symbols from the UE and not in the second set of symbols from the UE, the portion of the third transmission transmitted in the first set of symbols being bundled with the DM-RS in the first interval and the DM-RS in the second interval.

25. The method of claim 23, wherein the indication is associated with the inter-UE prioritization or the intra-UE prioritization, the method further comprising:
receiving DM-RS in symbols following the at least one symbol within the third interval from the UE and not in the at least one symbol from the UE, the DM-RS received in the symbols following the at least one symbol being bundled with the DM-RS in the first interval and the DM-RS in the second interval.

26. An apparatus for wireless communication at a base station, comprising:
a memory; and
at least one processor coupled to the memory and configured to:
receive capability signaling information from a user equipment (UE);
receive an uplink communication from the UE, the uplink communication comprising a time interval comprising a first interval corresponding to a first uplink transmission, a second interval corresponding to a second uplink transmission, and a third interval corresponding to a third uplink transmission, the uplink communication further comprising DM-RS in the first and second intervals;
determine that the UE dropped at least one symbol within the third interval; and
decode the first interval and the second interval, wherein whether the DM-RS in the second interval is utilized for decoding the first interval and whether the DM-RS in the first interval is utilized for decoding the second interval is based on the capability signaling information.

27. The apparatus of claim 26, wherein the capability signaling information comprises information indicating a number of symbols the UE can drop within the time interval while maintaining bundling of the DM-RS across the time interval.

28. The apparatus of claim 26, wherein the at least one processor is further configured to transmit an indication to drop the at least one symbol, the indication being associated with one of a time division duplex (TDD) conflict, an inter-UE prioritization, or an intra-UE prioritization.

29. The apparatus of claim 28, wherein the indication is associated with the TDD conflict, wherein a first set of symbols within in the third interval is associated at least with uplink transmissions, and wherein a second set of symbols within the third interval comprises the at least one symbols and is associated at least with downlink transmissions, and wherein the at least one processor is further configured to:
receive a portion of the third transmission in the first set of symbols from the UE and not in the second set of symbols from the UE, the portion of the third transmission transmitted in the first set of symbols being bundled with the DM-RS in the first interval and the DM-RS in the second interval.

30. The apparatus of claim 28, wherein the indication is associated with the inter-UE prioritization or the intra-UE prioritization, wherein the at least one processor is further configured to:
receive DM-RS in a symbol following the at least one symbol from the UE and not in the at least one symbol from the UE, the DM-RS received in the symbol following the at least one symbol being bundled with the DM-RS in the first interval and the DM-RS in the second interval.

* * * * *